(12) United States Patent
Zhao et al.

(10) Patent No.: US 11,533,761 B2
(45) Date of Patent: Dec. 20, 2022

(54) INFORMATION PROCESSING METHOD AND DEVICE

(71) Applicant: Huawei Technologies Co., Ltd., Shenzhen (CN)

(72) Inventors: Yue Zhao, Beijing (CN); Zheng Yu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/063,362

(22) Filed: Oct. 5, 2020

(65) Prior Publication Data
US 2021/0022190 A1 Jan. 21, 2021

Related U.S. Application Data

(63) Continuation of application No. PCT/CN2018/086619, filed on May 11, 2018.

(30) Foreign Application Priority Data

Apr. 4, 2018 (WO) ............... PCT/CN2018/082050

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0037* (2013.01); *H04W 72/0446* (2013.01); *H04W 72/0453* (2013.01); *H04W 72/14* (2013.01)

(58) Field of Classification Search
None
See application file for complete search history.

(56) References Cited

U.S. PATENT DOCUMENTS

2011/0085509 A1* 4/2011 Park .................... H04W 72/042
370/329
2016/0100422 A1* 4/2016 Papasakellariou ..........................
H04W 72/1289
370/329
(Continued)

FOREIGN PATENT DOCUMENTS

CN 101821988 A 9/2010
CN 104185293 A 12/2014
(Continued)

OTHER PUBLICATIONS

Ericsson, "NB-IoT—Remaining issues for random access procedure," 3GPP TSG-RAN WG1 NB-IoT Ad-Hoc Meeting Sophia Antipolis, France, R1-161836, total 7 pages, 3rd Generation Partnership Project, Valbonne, France (Mar. 22-24, 2016).
(Continued)

*Primary Examiner* — Diane L Lo
(74) *Attorney, Agent, or Firm* — Leydig, Voit & Mayer, Ltd.

(57) ABSTRACT

An information processing method and a device are provided. The method includes: receiving, by a terminal device, a random access response grant, where the random access response grant includes a resource allocation field, and when the random access response grant is used for scheduling of a first Msg3, the resource allocation field includes four bits, the resource allocation field performs resource indication in narrowband based on an uplink resource allocation type 0, and the resource allocation field is capable of indicating resource allocation of one of one resource block, two resource blocks, three resource blocks, or six resource blocks in the narrowband; determining, by the terminal device based on the resource allocation field, a resource block allocated to the terminal device; and sending, by the (Continued)

terminal device, the first Msg3 or the second Msg3 to a network device on the allocated resource block.

8 Claims, 6 Drawing Sheets

(51) Int. Cl.
*H04W 72/04* (2009.01)
*H04W 72/14* (2009.01)

(56) References Cited

U.S. PATENT DOCUMENTS

| | | | |
|---|---|---|---|
| 2017/0273113 | A1 | 9/2017 | Tirronen et al. |
| 2017/0289965 | A1 | 10/2017 | You et al. |
| 2019/0261407 | A1* | 8/2019 | Irukulapati ......... H04W 74/008 |
| 2020/0344818 | A1* | 10/2020 | Höglund ............. H04W 74/004 |
| 2021/0058947 | A1* | 2/2021 | Lin ................... H04W 74/0833 |

FOREIGN PATENT DOCUMENTS

| | | |
|---|---|---|
| CN | 105992383 A | 10/2016 |
| CN | 107466113 A | 12/2017 |
| CN | 105264983 B | 10/2019 |
| CN | 106664720 B | 10/2019 |
| WO | 2016053026 A1 | 4/2016 |
| WO | 2017088783 A1 | 6/2017 |
| WO | 2017176033 A1 | 10/2017 |

OTHER PUBLICATIONS

Huawei, HiSilicon, "RACH procedures and resource configuration," 3GPP TSG RAN WG1 Meeting #90, Prague, Czech Republic, R1-1712145, total 4 pages, 3rd Generation Partnership Project, Valbonne, France (Aug. 21-25, 2017).

"3rd Generation Partnership Project; Technical Specification Group Radio Access Network; Evolved Universal Terrestrial Radio Access (E-UTRA); Physical layer procedures (Release 13)," 3GPP TS 36.213 V13.9.0, pp. 1-394, 3rd Generation Partnership Project, Valbonne, France (Mar. 2018).

"Remaining potential agreements for EDT in eMTC," 3GPP TSG RAN WG1 Meeting #92, Athens, Greece, R1-1803126, pp. 1-4, 3rd Generation Partnership Project, Valbonne, France (Feb. 26-Mar. 2, 2018).

"3rd Generation Partnership Project; Technical Specification Group Radio Access Network; Evolved Universal Terrestrial Radio Access (E-UTRA); Physical layer procedures (Release 14)," 3GPP TS 36.213 V14.3.0, pp. 1-460, 3rd Generation Partnership Project, Valbonne, France (Jun. 2017).

"Consideration on UL grant for Msg3," 3GPP TSG-RAN WG2 Meeting #101, Athens, Greece, R2-1802997, pp. 1-2, 3rd Generation Partnership Project, Valbonne, France (Feb. 26-Mar. 2, 2018).

"Summary of email discussion [82b-03] on DCI contents for eMTC",3GPP TSG RAN WG1 Meeting #83, Anaheim, USA, R1-157503, pp. 1-28, 3rd Generation Partnership Project, Valbonne, France (Nov. 15-22, 2015).

"TB sizes and UL grant for Msg3," 3GPP TSG-RAN WG2 #101, Athens, Greece, R2-1803080, pp. 1-5, 3rd Generation Partnership Project, Valbonne, France (Feb. 26-Mar. 2, 2018).

Huawei et al., "On early data transmission for eFeMTC", 3GPP TSG RAN WG1 Meeting #89, Hangzhou, China, R1-1708198, 3 pages, 3rd Generation Partnership Project, Valbonne, France (May 15-19, 2017).

Nokia et al., "Data transmission during random access procedure", 3GPP TSG RAN WG1 Meeting #90bis, Prague, Czech Republic, R1-1717221, 3 pages, 3rd Generation Partnership Project, Valbonne, France (Oct. 9-13, 2017).

"3rd Generation Partnership Project; Technical Specification Group Radio Access Network; Evolved Universal Terrestrial Radio Access (E-UTRA); Physical layer procedures (Release 15)," 3GPP TS 36.213 V15.1.0, total 499 pages, 3rd Generation Partnership Project, Valbonne, France (Mar. 2018).

* cited by examiner

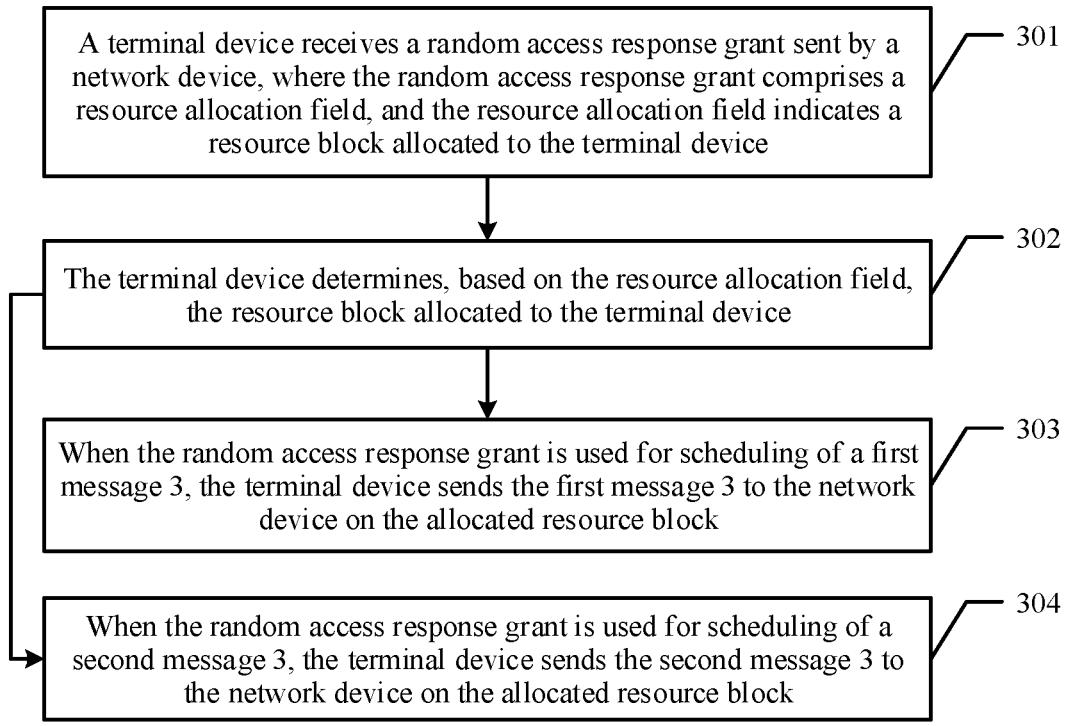
FIG. 3-a
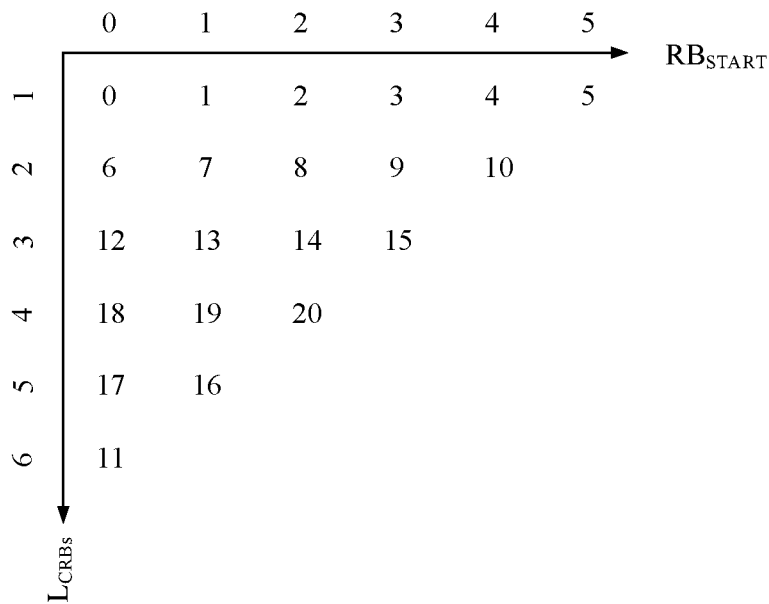
FIG. 3-b

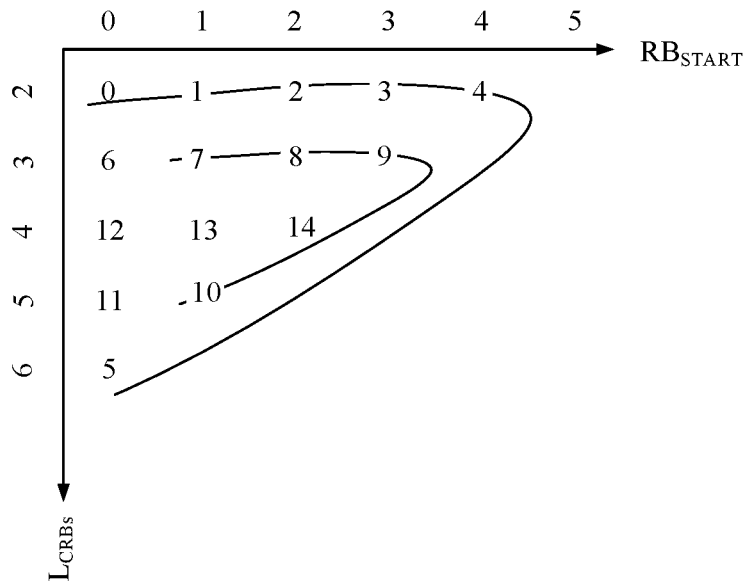
FIG. 3-c
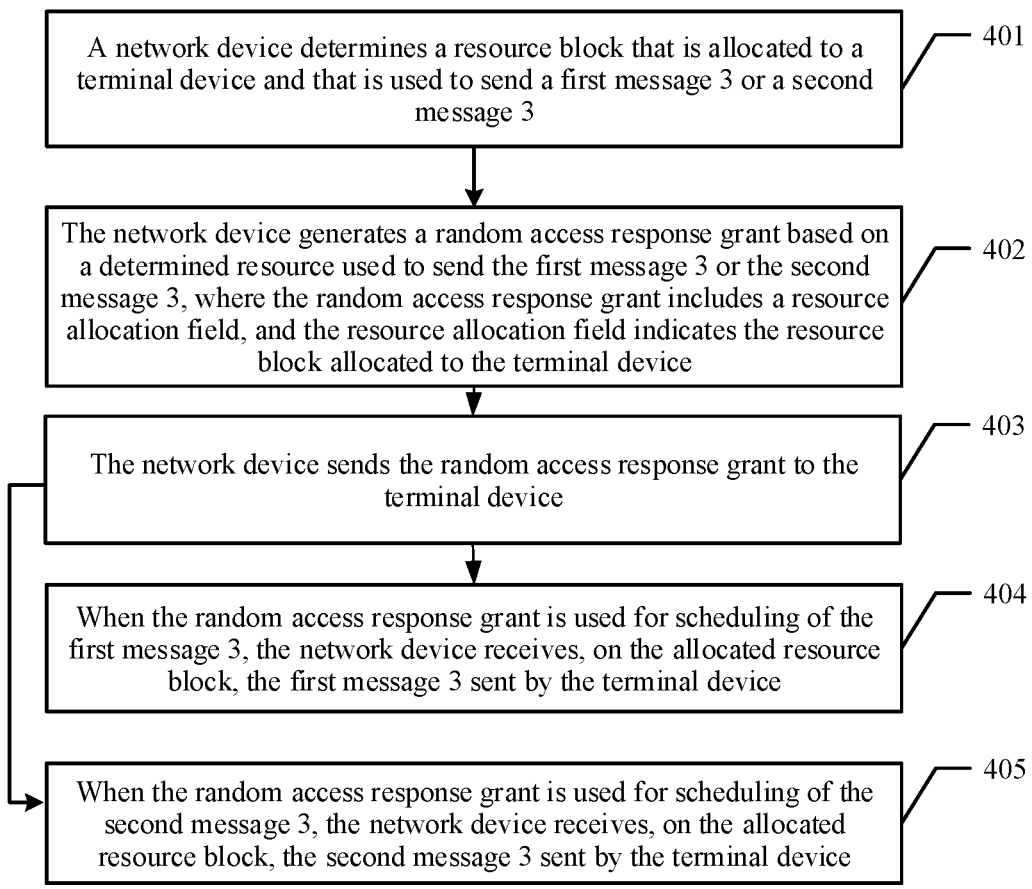
FIG. 4

INFORMATION PROCESSING METHOD AND DEVICE

CROSS-REFERENCE TO RELATED APPLICATIONS

This application is a continuation of International Application No. PCT/CN2018/086619, filed on May 11, 2018, which claims priority to International Application No. PCT/CN2018/082050, filed on Apr. 4, 2018. The disclosures of the aforementioned applications are hereby incorporated by reference in their entireties.

TECHNICAL FIELD

Embodiments of this application relate to the communications field, and in particular, to an information processing method and a device.

BACKGROUND

Currently, wireless communications systems are applied and deployed on a large scale, and may provide a plurality of users with various types of communication, for example, a voice, data, and a multimedia service.

In a discussion process of a current long term evolution (LTE) technology, uplink user data may be transmitted by using the third message, namely, a Msg3, in a random access process, and a media access control (MAC) random access response (RAR) is used.

Coverage enhancement modes of a terminal device may include a coverage enhancement mode A (CE mode A) and a coverage enhancement mode B (CE mode B). The coverage enhancement mode A is used for a smaller coverage enhancement degree. The coverage enhancement mode B is used for a larger coverage enhancement degree.

For the coverage enhancement mode A, a value range of a modulation and coding scheme (MCS) is 0 to 15. For the coverage enhancement mode B, a value range of the MCS is 0 to 10. For the coverage enhancement mode B, only quadrature phase shift keying (QPSK) modulation is supported. For the coverage enhancement mode A, QPSK modulation and 16-quadrature amplitude modulation (QAM) are supported. How to implement resource allocation in a coverage enhancement mode is a problem that needs to be urgently resolved in the art.

SUMMARY

Embodiments of this application provide an information processing method and a device, so that a status on a network side can be considered as much as possible, and a waste of transmission resources can be avoided.

According to a first aspect, an embodiment of this application provides an information processing method, including:

receiving, by a terminal device, a random access response grant sent by a network device, where the random access response grant includes a resource allocation field, and the resource allocation field indicates a resource block allocated to the terminal device, where when the random access response grant is used for scheduling of a first message 3 Msg3, the resource allocation field includes four bits, the resource allocation field performs resource indication in narrowband based on an uplink resource allocation type 0, and the resource allocation field is capable of indicating resource allocation of one of one resource block, two resource blocks, three resource blocks, or six resource blocks in the narrowband; or when the random access response grant is used for scheduling of a second Msg3, the resource allocation field includes N bits, where N is a positive integer, the resource allocation field is at least capable of indicating resource allocation of one of two resource blocks, three resource blocks, or six resource blocks in narrowband, and the second Msg3 is used for data transmission;

determining, by the terminal device based on the resource allocation field, the resource block allocated to the terminal device; and sending, by the terminal device, the first Msg3 to the network device on the allocated resource block when the random access response grant is used for the scheduling of the first Msg3; or sending, by the terminal device, the second Msg3 to the network device on the allocated resource block when the random access response grant is used for the scheduling of the second Msg3.

In this embodiment of this application, the network device allocates corresponding resources for different messages 3 that need to be scheduled, and uses the resource allocation field to indicate resource allocation statuses that occur when the different messages 3 are scheduled. Specifically, when the random access response grant is used for the scheduling of the first message 3, the resource allocation field includes the four bits, the resource allocation field performs resource indication in the narrowband based on the uplink resource allocation type 0, and the resource allocation field is capable of indicating the resource allocation of one of the one resource block, the two resource blocks, the three resource blocks, or the six resource blocks in the narrowband. For current resource allocation, the resource allocation field specifically indicates one type of the resource allocation. When the random access response grant is used for the scheduling of the second message 3, the resource allocation field includes the N bits, where N is a positive integer, and the resource allocation field is at least capable of indicating the resource allocation of one of the two resource blocks, the three resource blocks, or the six resource blocks in the narrowband. For current resource allocation, the resource allocation field specifically indicates one type of the resource allocation. In this embodiment of this application, the network device allocates specific resource blocks for the different messages 3 that need to be scheduled. For example, when the first message 3 is scheduled, the network device may perform resource allocation based on the one resource block, the two resource blocks, the three resource blocks, or the six resource blocks. When the second message 3 is scheduled, the network device may perform resource allocation based on the two resource blocks, the three resource blocks, or the six resource blocks. In this way, a resource allocation problem during scheduling of the different messages 3 is resolved. The terminal device may send the messages 3 based on the resource blocks allocated by the network device for the different messages 3. This improves resource utilization and a system capacity.

In a possible design of the first aspect, when the random access response grant is used for the scheduling of the second Msg3, the resource allocation field is further capable of indicating resource allocation of four resource blocks and/or five resource blocks in the narrowband; or the resource allocation field is further capable of indicating resource allocation of one resource block in the narrowband.

When the random access response grant is used for the scheduling of the second message 3, "is further capable of indicating" herein means that in addition to indicating the resource allocation of one of the two resource blocks, the three resource blocks, or the six resource blocks, the resource allocation field is further capable of indicating the resource allocation of the four resource blocks, is further capable of indicating the resource allocation of the five resource blocks, or is further capable of indicating the resource allocation of the four resource blocks and the five resource blocks. In addition, when the random access response grant is used for the scheduling of the second message 3, in addition to indicating the resource allocation of one of the two resource blocks, the three resource blocks, or the six resource blocks, the resource allocation field is further capable of indicating the resource allocation of the one resource block in the narrowband. A quantity, of resource blocks indicated by the resource allocation field, configured by the network device may be determined based on an application scenario. For example, the network device determines the quantity based on current network load.

In a possible design of the first aspect, that the resource allocation field is further capable of indicating resource allocation of four resource blocks and/or five resource blocks in the narrowband includes:

when N is equal to 4, that the resource allocation field indicates resource allocation in the narrowband includes: the resource allocation field is only capable of indicating resource allocation of one of the two resource blocks, the three resource blocks, the four resource blocks, the five resource blocks, or the six resource blocks in the narrowband;

when N is equal to 4, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband; or when N is equal to 5, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband.

The resource allocation field may occupy four bits in the random access response grant. When a Msg3 supports EDT, the resource allocation field may be a "Msg3 PUSCH Resource allocation" field in a UL grant in a MAC RAR. For example, the resource allocation field occupies four bits. The resource allocation field is only capable of indicating the resource allocation of one of the two resource blocks, the three resource blocks, the four resource blocks, the five resource blocks, or the six resource blocks in the narrowband. The phrase "is only capable of indicating" means that a resource block quantity allocated by the network device is only capable of being selected from the two resource blocks, the three resource blocks, the four resource blocks, the five resource blocks, or the six resource blocks in the narrowband. When N is equal to 4, the resource allocation field is only capable of indicating the resource allocation of one of the one resource block, the two resource blocks, the three resource blocks, the four resource blocks, the five resource blocks, or the six resource blocks in the narrowband. "Is only capable of indicating" means that a resource block quantity allocated by the network device is only capable of being selected from the one resource block, the two resource blocks, the three resource blocks, the four resource blocks, the five resource blocks, and the six resource blocks in the narrowband. Similarly, the resource allocation field may alternatively occupy five bits. When N is equal to 5, the resource allocation field performs resource indication in the narrowband based on the uplink resource allocation type 0. In this embodiment of this application, when different bits are configured for the resource allocation field, a specific quantity of resource blocks may be indicated. The network device may indicate a specific quantity of allocated resource blocks by using a bit value of the resource allocation field, so that the terminal device determines, by parsing the bit value of the resource allocation field, a resource block quantity allocated by the network device for the second message 3, and uplink transmission of the second message 3 is ensured.

In a possible design of the first aspect, when N is equal to 4, and the resource allocation field is only capable of indicating the resource allocation of one of the two resource blocks, the three resource blocks, the four resource blocks, the five resource blocks, or the six resource blocks in the narrowband, the determining, by the terminal device based on the resource allocation field, the resource block allocated to the terminal device includes:

determining, by the terminal device, a first resource indicator value based on the resource allocation field;

determining, by the terminal device, a second resource indicator value based on the first resource indicator value, where a relationship between the first resource indicator value and the second resource indicator value meets a correspondence shown in the following formula:

second resource indicator value=first resource indicator value+6; and determining, by the terminal device based on the second resource indicator value and the uplink resource allocation type 0, the resource block allocated to the terminal device.

The resource allocation field may indicate resource allocation solutions of a total of five lengths, namely, a resource block quantity 2, 3, 4, 5, and 6, and a remaining state is unused. For example, if the second resource indicator value is represented by RIV_EDT, RIV_EDT=6 to 20, and the first resource indicator value is represented by RIV_legacy, RIV_EDT=RIV_legacy+6. When a base station schedules UE that supports EDT to early send data by using the Msg3, "Msg3 PUSCH Resource allocation" in the UL grant in the MAC RAR indicates RIV_legacy. However, when the UE interprets a UL grant that supports EDT, actual RIV_EDT is 6 plus a RIV_legacy value indicated by using four bits.

In a possible design of the first aspect, when N is equal to 4, and the resource allocation field is only capable of indicating the resource allocation of one of the two resource blocks, the three resource blocks, the four resource blocks, the five resource blocks, or the six resource blocks in the narrowband, the determining, by the terminal device based on the resource allocation field, the resource block allocated to the terminal device includes:

determining, by the terminal device, an allocated resource block quantity and an allocated start resource block index by using the following correspondence based on a third resource indicator value indicated by the resource allocation field, where a correspondence between the third resource indicator value indicated by the resource allocation field and both the allocated resource block quantity and the allocated start resource block index meets the correspondence shown in the following formula:

when $(L_{CRBs}-2) \leq \text{floor}((M-1)/2)$, the third resource indicator value is equal to $M(L_{CRBs}-2)+RB_{START}$; or when $(L_{CRBs}-2) > \text{floor}((M-1)/2)$, the third resource indicator value is equal to $M(M-L_{CRBs})+(M-1-RB_{START})$, where $M=6$, $L_{CRBs}$ is the allocated resource block quantity, $2 \leq L_{CRBs} \leq 6$, $RB_{START}$ is the allocated start resource block index, and floor represents rounding down.

In some embodiments of this application, the network device indicates the third resource indicator value to the terminal device by using the resource allocation field, and the terminal device may determine, with reference to the foregoing formulas by using the third resource indicator value, the resource block quantity and the start resource block index that are allocated by the network device. "Meets" in "a correspondence between the third resource indicator value and both the allocated resource block quantity and the allocated start resource block index meets the correspondence shown in the following formula" is not limited to a same representation form, and for example, may alternatively be in a form such as a table.

In a possible design of the first aspect, when N is equal to 4, and the resource allocation field is only capable of indicating the resource allocation of one of the two resource blocks, the three resource blocks, the four resource blocks, the five resource blocks, or the six resource blocks in the narrowband, the determining, by the terminal device based on the resource allocation field, the resource block allocated to the terminal device includes:

determining, by the terminal device, an allocated resource block quantity and an allocated start resource block index by using the following correspondence based on a fourth resource indicator value indicated by the resource allocation field, where a correspondence between the fourth resource indicator value indicated by the resource allocation field and both the allocated resource block quantity and the allocated start resource block index meets the correspondence shown in the following formula:

when $(L_{CRBs}-2) \leq \text{floor}(M/2)$, the fourth resource indicator value is equal to $M(L_{CRBs}-2)+RB_{START}$; or when $(L_{CRBs}-2) > \text{floor}(M/2)$, the fourth resource indicator value is equal to $M(M-L_{CRBs}+2)+(M-1-RB_{START})$, where $M=5$, $L_{CRBs}$ is the allocated resource block quantity, $2 \leq L_{CRBs} \leq 6$, $RB_{START}$ is the allocated start resource block index, and floor represents rounding down.

In some embodiments of this application, the network device indicates the fourth resource indicator value to the terminal device by using the resource allocation field, and the terminal device may determine, with reference to the foregoing formulas by using the fourth resource indicator value, the resource block quantity and the start resource block index that are allocated by the network device. "Meets" in "a correspondence between the fourth resource indicator value and both the allocated resource block quantity and the allocated start resource block index meets the correspondence shown in the following formula" is not limited to a same representation form, and for example, may alternatively be in a form such as a table.

In a possible design of the first aspect, when N is equal to 4, the resource allocation field is only capable of indicating resource allocation of one of the one resource block, the two resource blocks, the three resource blocks, the four resource blocks, the five resource blocks, or the six resource blocks in the narrowband, and the resource allocation field indicates the one resource block in the narrowband, only one of bit states of the resource allocation field is used to allocate the one resource block.

When the random access response grant is used for the scheduling of the second message 3, that the resource allocation field includes four bits is used as an example, and only one of all the bit states of the resource allocation field is capable of indicating that one resource block is allocated. The resource allocation field provided in this embodiment of this application can be used to indicate the resource allocation of the one resource block, the two resource blocks, the three resource blocks, the four resource blocks, the five resource blocks, or the six resource blocks in the narrowband. To be specific, the network device may indicate the terminal device to transmit the second message 3 by using resource blocks of different sizes, to improve resource utilization and a system capacity.

In a possible design of the first aspect, the determining, by the terminal device based on the resource allocation field, the resource block allocated to the terminal device includes: determining, by the terminal device, a fifth resource indicator value based on the resource allocation field;

determining, by the terminal device, a sixth resource indicator value based on the fifth resource indicator value, where a relationship between the fifth resource indicator value and the sixth resource indicator value meets a correspondence shown in the following formula:

sixth resource indicator value=fifth resource indicator value+5; and determining, by the terminal device, the allocated resource block based on the sixth resource indicator value and the uplink resource allocation type 0.

The resource allocation field indicates that one remaining state is used to indicate one PRB. For example, if the sixth resource indicator value is represented by RIV_EDT, RIV_EDT=5 to 20, and the fifth resource indicator value is represented by RIV_legacy, RIV_EDT=RIV_legacy+5. When RIV_legacy=0, RIV_EDT=5, and a corresponding PRB quantity is 1.

In a possible design of the first aspect, the bit state is 0000, and an allocated start resource block index in the resource allocation field is 5. Another bit state of the resource allocation field may alternatively be used to indicate one resource block. For example, only one bit state 1111 is used to indicate one resource block. This is not limited herein.

In a possible design of the first aspect, the resource allocation field is further capable of indicating the resource allocation of the one resource block in the narrowband, and that the resource allocation field indicates resource allocation in the narrowband includes: the resource allocation field is only capable of indicating resource allocation of one of the one resource block, the two resource blocks, the three resource blocks, or the six resource blocks in the narrowband; and the determining, by the terminal device, the allocated resource block based on the resource allocation field includes:

when the resource allocation field indicates the resource allocation of the one resource block in the narrowband, determining, by the terminal device, that the allocated resource block is one resource block, and determining a size of a transport block for the second Msg3 based on K resource blocks, where K is a pre-specified positive integer greater than 1.

The network device may indicate allocation of one resource block by using the resource allocation field. In this case, the terminal device may determine, by parsing the resource allocation field, that the network device allocates one resource block for the second message 3. In this case, a size of a transport block for the second message 3 that needs to be sent by the terminal device is no longer determined based on the one resource block indicated by the network device. Instead, the size of the transport block for the second message 3 is determined by using the K resource blocks.

In a possible design of the first aspect, when N is equal to 4, and the resource allocation field is only capable of indicating the resource allocation of one of the two resource blocks, the three resource blocks, the four resource blocks, the five resource blocks, or the six resource blocks in the narrowband, the determining, by the terminal device based on the resource allocation field, the resource block allocated to the terminal device includes:

determining, by the terminal device, an allocated resource block quantity and an allocated start resource block index by using the following correspondence based on a seventh resource indicator value indicated by the resource allocation field, where a correspondence between the seventh resource indicator value indicated by the resource allocation field and both the allocated resource block quantity and the allocated start resource block index meets the correspondence shown in the following formula:

when $(L_{CRBs}-1) \leq \lfloor N_{RB}^{UL}/2 \rfloor$, the seventh resource indicator value is equal to $N_{RB}^{UL}(L_{CRBs}-2)+RB_{START}$; or when $(L_{CRBs}-1) > \lfloor N_{RB}^{UL}/2 \rfloor$, the seventh resource indicator value is equal to $N_{RB}^{UL}(N_{RB}^{UL}-L_{CRBs})+(N_{RB}^{UL}-1-RB_{START})$, where $N_{RB}^{UL}$ is equal to 6, $L_{CRBs}$ is the allocated resource block quantity, $2 \leq L_{CRBs} \leq 6$, $RB_{START}$ is the allocated start resource block index, and $\lfloor N_{RB}^{UL}/2 \rfloor$ represents rounding $N_{RB}^{UL}$ down.

According to a second aspect, an embodiment of this application further provides an information processing method, including:

determining, by a network device, a resource block that is allocated to a terminal device and that is used to send a first message 3 Msg3 or a second Msg3, where the second Msg3 is used for data transmission;

determining, by the network device, a random access response grant, where the random access response grant includes a resource allocation field, and the resource allocation field indicates the resource block allocated to the terminal device, where when the random access response grant is used for scheduling of the first Msg3, the resource allocation field includes four bits, the resource allocation field performs resource indication in narrowband based on an uplink resource allocation type 0, and the resource allocation field is capable of indicating resource allocation of one of one resource block, two resource blocks, three resource blocks, or six resource blocks in the narrowband; or when the random access response grant is used for scheduling of the second Msg3, the resource allocation field includes N bits, where N is a positive integer, and the resource allocation field is at least capable of indicating resource allocation of one of two resource blocks, three resource blocks, or six resource blocks in narrowband;

sending, by the network device, the random access response grant to the terminal device; and receiving, by the network device on the allocated resource block when the random access response grant is used for the scheduling of the first Msg3, the first Msg3 sent by the terminal device; or receiving, by the network device on the allocated resource block when the random access response grant is used for the scheduling of the second Msg3, the second Msg3 sent by the terminal device.

In a possible design of the second aspect, when the random access response grant is used for the scheduling of the second Msg3, the resource allocation field is further capable of indicating resource allocation of four resource blocks and/or five resource blocks in the narrowband; or the resource allocation field is further capable of indicating resource allocation of one resource block in the narrowband.

In a possible design of the second aspect, that the resource allocation field is further capable of indicating resource allocation of four resource blocks and/or five resource blocks in the narrowband includes:

when N is equal to 4, that the resource allocation field indicates resource allocation in the narrowband includes: the resource allocation field is only capable of indicating resource allocation of one of the two resource blocks, the three resource blocks, the four resource blocks, the five resource blocks, or the six resource blocks in the narrowband;

when N is equal to 4, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband; or when N is equal to 5, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband.

In a possible design of the second aspect, when N is equal to 4, and the resource allocation field is only capable of indicating the resource allocation of one of the two resource blocks, the three resource blocks, the four resource blocks, the five resource blocks, or the six resource blocks in the narrowband, the determining, by the network device, a random access response grant includes:

determining, by the network device, a second resource indicator value based on a determined resource used to send the first Msg3 or the second Msg3 and the uplink resource allocation type 0 used by the terminal device;

determining, by the network device, a first resource indicator value based on the second resource indicator value, where a relationship between the first resource indicator value and the second resource indicator value meets a correspondence shown in the following formula:

first resource indicator value=second resource indicator value−6; and determining, by the network device, the resource allocation field in the random access response grant, where the resource allocation field indicates the first resource indicator value, and the first resource indicator value is used to indicate the resource block allocated to the terminal device.

In a possible design of the second aspect, when N is equal to 4, and the resource allocation field is only capable of indicating the resource allocation of one of the two resource blocks, the three resource blocks, the four resource blocks, the five resource blocks, or the six resource blocks in the narrowband, the determining, by the network device, a random access response grant includes:

determining, by the network device, a third resource indicator value by using the following correspondence based on an allocated resource block quantity and an allocated start resource block index, where a correspondence between the third resource indicator value and both the allocated resource block quantity and the allocated start resource block index meets the correspondence shown in the following formula:

when $(L_{CRBs}-2) \leq \text{floor}((M-1)/2)$, the third resource indicator value is equal to $M(L_{CRBs}-2)+RB_{START}$; or when $(L_{CRBs}-2) > \text{floor}((M-1)/2)$, the third resource indicator value is equal to $M(M-L_{CRBs})\pm(M-1-RB_{START})$, where $M=6$, $L_{CRBs}$ is the allocated resource block quantity, $2 \leq L_{CRBs} \leq 6$, $RB_{START}$ is the allocated start resource block index, and floor represents rounding down; and determining, by the network device, the resource allocation field in the random access response grant, where the resource allocation field indicates the third resource indicator value, and the third resource indicator value is used to indicate the resource block allocated to the terminal device.

In a possible design of the second aspect, when N is equal to 4, and the resource allocation field is only capable of indicating the resource allocation of one of the two resource blocks, the three resource blocks, the four resource blocks, the five resource blocks, or the six resource blocks in the narrowband, the determining, by the network device, a random access response grant includes:

determining, by the network device, a fourth resource indicator value by using the following correspondence based on an allocated resource block quantity and an allocated start resource block index, where a correspondence between the fourth resource indicator value and both the allocated resource block quantity and the allocated start resource block index meets the correspondence shown in the following formula:

when $(L_{CRBs}-2) \leq \text{floor}(M/2)$, the fourth resource indicator value is equal to $M(L_{CRBs}-2)+RB_{START}$; or when $(L_{CRBs}-2) > \text{floor}(M/2)$, the fourth resource indicator value is equal to $M(M-L_{CRBs}+2)+(M-1-RB_{START})$, where $M=5$, $L_{CRBs}$ is the allocated resource block quantity, $2 \leq L_{CRBs} \leq 6$, $RB_{START}$ is the allocated start resource block index, and floor represents rounding down; and determining, by the network device, the resource allocation field in the random access response grant, where the resource allocation field indicates the fourth resource indicator value, and the fourth resource indicator value is used to indicate the resource block allocated to the terminal device.

In a possible design of the second aspect, when N is equal to 4, the resource allocation field is only capable of indicating resource allocation of the one resource block, the two resource blocks, the three resource blocks, the four resource blocks, the five resource blocks, or the six resource blocks in the narrowband, the resource allocation field indicates the one resource block in the narrowband; and only one of bit states of the resource allocation field is used to allocate the one resource block.

In a possible design of the second aspect, the determining, by the network device, a random access response grant includes:

determining, by the network device, a sixth resource indicator value based on a determined resource used to send the first Msg3 or the second Msg3 and the uplink resource allocation type 0 used by the terminal device;

determining, by the network device, a fifth resource indicator value based on the sixth resource indicator value, where a relationship between the fifth resource indicator value and the sixth resource indicator value meets a correspondence shown in the following formula:

fifth resource indicator value=sixth resource indicator value−5; and determining, by the network device, the resource allocation field in the random access response grant, where the resource allocation field indicates the fifth resource indicator value, and the fifth resource indicator value is used to indicate the resource block allocated to the terminal device.

In a possible design of the second aspect, the bit state is 0000, and an allocated start resource block index in the resource allocation field is 5.

In a possible design of the second aspect, the resource allocation field is further capable of indicating the resource allocation of the one resource block in the narrowband, and that the resource allocation field indicates resource allocation in the narrowband includes: the resource allocation field is only capable of indicating resource allocation of one of the one resource block, the two resource blocks, the three resource blocks, or the six resource blocks in the narrowband; and when the resource allocation field indicates the resource allocation of the one resource block in the narrowband, the network device determines that the allocated resource block is one resource block, and determines a size of a transport block for the second Msg3 based on K resource blocks, where K is a pre-specified positive integer greater than 1.

In a possible design of the second aspect, when N is equal to 4, and the resource allocation field is only capable of indicating the resource allocation of one of the two resource blocks, the three resource blocks, the four resource blocks, the five resource blocks, or the six resource blocks in the narrowband, the determining, by the network device, a random access response grant includes:

determining, by the network device, a seventh resource indicator value by using the following correspondence based on an allocated resource block quantity and an allocated start resource block index, where a correspondence between the seventh resource indicator value and both the allocated resource block quantity and the allocated start resource block index meets the correspondence shown in the following formula:

when $(L_{CRBs}-1) \leq \lfloor N_{RB}^{UL}/2 \rfloor$, the seventh resource indicator value is equal to $N_{RB}^{UL}(L_{CRBs}-2)+RB_{START}$; or when $(L_{CRBs}-1) > \lfloor N_{RB}^{UL}/2 \rfloor$, the seventh resource indicator value is equal to $N_{RB}^{UL}(N_{RB}^{UL}-L_{CRBs})+(N_{RB}^{UL}-1-RB_{START})$, where $N_{RB}^{UL}$ is equal to 6, $L_{CRBs}$ is the allocated resource block quantity, $2 \leq L_{CRBs} \leq 6$, $RB_{START}$ is the allocated start resource block index, and $\lfloor N_{RB}^{UL}/2 \rfloor$ represents rounding $N_{RB}^{UL}$ down.

According to a third aspect, an embodiment of this application further provides a terminal device, including:

a receiving module, configured to receive a random access response grant sent by a network device, where the random access response grant includes a resource allocation field, and the resource allocation field indicates a resource block allocated to the terminal device, where when the random access response grant is used for scheduling of a first message 3 Msg3, the resource allocation field includes four bits, the resource allocation field performs resource indication in narrowband based on an uplink resource allocation type 0, and the resource allocation field is capable of indicating resource allocation of one of one resource block, two resource blocks, three resource blocks, or six resource blocks in the narrowband; or when the random access response grant is used for scheduling of a second Msg3, the resource allocation field includes N bits, where N is a positive integer, the resource allocation field is at least capable of indicating resource allocation of one of two resource blocks, three resource blocks, or six resource blocks in narrowband, and the second Msg3 is used for data transmission;

a processing module, configured to determine, based on the resource allocation field, the resource block allocated to the terminal device; and a sending module, configured to: send the first Msg3 to the network device on the allocated resource block when the random access response grant is used for the scheduling of the first Msg3; or send the second Msg3 to the network device on the allocated resource block when the random access response grant is used for the scheduling of the second Msg3.

In a possible design of the third aspect, when the random access response grant is used for the scheduling of the second Msg3, the resource allocation field is further capable of indicating resource allocation of four resource blocks and/or five resource blocks in the narrowband; or the resource allocation field is further capable of indicating resource allocation of one resource block in the narrowband.

In a possible design of the third aspect, that the resource allocation field is further capable of indicating resource allocation of four resource blocks and/or five resource blocks in the narrowband includes:

when N is equal to 4, that the resource allocation field indicates resource allocation in the narrowband includes: the resource allocation field is only capable of indicating resource allocation of one of the two resource blocks, the three resource blocks, the four resource blocks, the five resource blocks, or the six resource blocks in the narrowband;

when N is equal to 4, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband; or when N is equal to 5, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband.

In a possible design of the third aspect, when N is equal to 4, and the resource allocation field is only capable of indicating the resource allocation of one of the two resource blocks, the three resource blocks, the four resource blocks, the five resource blocks, or the six resource blocks in the narrowband, the processing module is configured to: determine a first resource indicator value based on the resource allocation field; determine a second resource indicator value based on the first resource indicator value, where a relationship between the first resource indicator value and the second resource indicator value meets a correspondence shown in the following formula: second resource indicator value=first resource indicator value+6; and determine, based on the second resource indicator value and the uplink resource allocation type 0, the resource block allocated to the terminal device.

In a possible design of the third aspect, when N is equal to 4, and the resource allocation field is only capable of indicating the resource allocation of one of the two resource blocks, the three resource blocks, the four resource blocks, the five resource blocks, or the six resource blocks in the narrowband, the processing module is configured to determine an allocated resource block quantity and an allocated start resource block index by using the following correspondence based on a third resource indicator value indicated by the resource allocation field, where a correspondence between the third resource indicator value indicated by the resource allocation field and both the allocated resource block quantity and the allocated start resource block index meets the correspondence shown in the following formula: when $(L_{CRBs}-2) \leq \text{floor}((M-1)/2)$, the third resource indicator value is equal to $M(L_{CRBs}-2)+RB_{START}$; or when $(L_{CRBs}-2) > \text{floor}((M-1)/2)$, the third resource indicator value is equal to $M(M-L_{CRBs})+(M-1-RB_{START})$, where M=6, $L_{CRBs}$ is the allocated resource block quantity, $2 \leq L_{CRBs} \leq 6$, $RB_{START}$ is the allocated start resource block index, and floor represents rounding down.

In a possible design of the third aspect, when N is equal to 4, and the resource allocation field is only capable of indicating the resource allocation of one of the two resource blocks, the three resource blocks, the four resource blocks, the five resource blocks, or the six resource blocks in the narrowband, the processing module is configured to determine an allocated resource block quantity and an allocated start resource block index by using the following correspondence based on a fourth resource indicator value indicated by the resource allocation field, where a correspondence between the fourth resource indicator value indicated by the resource allocation field and both the allocated resource block quantity and the allocated start resource block index meets the correspondence shown in the following formula: when $(L_{CRBs}-2) \leq \text{floor}(M/2)$, the fourth resource indicator value is equal to $M(L_{CRBs}-2)+RB_{START}$; or when $(L_{CRBs}-2) > \text{floor}(M/2)$, the fourth resource indicator value is equal to $M(M-L_{CRBs}+2)+(M-1-RB_{START})$, where M=5, $L_{CRBs}$ is the allocated resource block quantity, $2 \leq L_{CRBs} \leq 6$, $RB_{START}$ is the allocated start resource block index, and floor represents rounding down.

In a possible design of the third aspect, when N is equal to 4, the resource allocation field is only capable of indicating resource allocation of the one resource block, the two resource blocks, the three resource blocks, the four resource blocks, the five resource blocks, or the six resource blocks in the narrowband, and the resource allocation field indicates the one resource block in the narrowband, only one of bit states of the resource allocation field is used to allocate the one resource block.

In a possible design of the third aspect, the processing module is configured to: determine a fifth resource indicator value based on the resource allocation field; determine a sixth resource indicator value based on the fifth resource indicator value, where a relationship between the fifth resource indicator value and the sixth resource indicator value meets a correspondence shown in the following formula: sixth resource indicator value=fifth resource indicator value+5; and determine the allocated resource block based on the sixth resource indicator value and the uplink resource allocation type 0.

In a possible design of the third aspect, the bit state is 0000, and an allocated start resource block index in the resource allocation field is 5.

In a possible design of the third aspect, the resource allocation field is further capable of indicating the resource allocation of the one resource block in the narrowband, and that the resource allocation field indicates resource allocation in the narrowband includes: the resource allocation field is only capable of indicating resource allocation of one of the one resource block, the two resource blocks, the three resource blocks, or the six resource blocks in the narrowband; and the processing module is configured to: when the resource allocation field indicates the resource allocation of the one resource block in the narrowband, determine, by the terminal device, that the allocated resource block is one resource block, and determine a size of a transport block for the second Msg3 based on K resource blocks, where K is a pre-specified positive integer greater than 1.

In a possible design of the third aspect, when N is equal to 4, and the resource allocation field is only capable of indicating the resource allocation of one of the two resource blocks, the three resource blocks, the four resource blocks, the five resource blocks, or the six resource blocks in the narrowband, the processing module is configured to determine an allocated resource block quantity and an allocated start resource block index by using the following correspondence based on a seventh resource indicator value indicated by the resource allocation field, where a correspondence between the seventh resource indicator value indicated by the resource allocation field and both the allocated resource block quantity and the allocated start resource block index meets the correspondence shown in the following formula:

when $(L_{CRBs}-1) \leq \lfloor N_{RB}^{UL}/2 \rfloor$, the seventh resource indicator value is equal to $N_{RB}^{UL}(L_{CRBs}-2)+RB_{START}$; or when $(L_{CRBs}-1) > \lfloor N_{RB}^{UL}/2 \rfloor$, the seventh resource indicator value is equal to $N_{RB}^{UL}(N_{RB}^{UL}-L_{CRBs})+(N_{RB}^{UL}-1-RB_{START})$, where $N_{RB}^{UL}$ is equal to 6, $L_{CRBs}$ is the allocated resource block quantity, $2 \leq L_{CRBs} \leq 6$, $RB_{START}$ is the allocated start resource block index, and $\lfloor N_{RB}^{UL}/2 \rfloor$ represents rounding $N_{RB}^{UL}$ down.

In the third aspect of this application, the compositional modules of the terminal device may alternatively perform the steps described in the first aspect and the possible implementations. For details, refer to the foregoing descriptions of the first aspect and the possible implementations.

According to a fourth aspect, an embodiment of this application further provides a network device, including:

a processing module, configured to determine a resource block that is allocated to a terminal device and that is used to send a first message 3 Msg3 or a second Msg3, where the second Msg3 is used for data transmission; where the processing module is further configured to determine a random access response grant, where the random access response grant includes a resource allocation field, and the resource allocation field indicates the resource block allocated to the terminal device, where when the random access response grant is used for scheduling of the first Msg3, the resource allocation field includes four bits, the resource allocation field performs resource indication in narrowband based on an uplink resource allocation type 0, and the resource allocation field is capable of indicating resource allocation of one of one resource block, two resource blocks, three resource blocks, or six resource blocks in the narrowband; or when the random access response grant is used for scheduling of the second Msg3, the resource allocation field includes N bits, where N is a positive integer, and the resource allocation field is at least capable of indicating resource allocation of one of two resource blocks, three resource blocks, or six resource blocks in narrowband;

a sending module, configured to send the random access response grant to the terminal device; and a receiving module, configured to: receive, on the allocated resource block when the random access response grant is used for the scheduling of the first Msg3, the first Msg3 sent by the terminal device; or receive, on the allocated resource block when the random access response grant is used for the scheduling of the second Msg3, the second Msg3 sent by the terminal device.

In a possible design of the fourth aspect, when the random access response grant is used for the scheduling of the second Msg3, the resource allocation field is further capable of indicating resource allocation of four resource blocks and/or five resource blocks in the narrowband; or the resource allocation field is further capable of indicating resource allocation of one resource block in the narrowband.

In a possible design of the fourth aspect, that the resource allocation field is further capable of indicating resource allocation of four resource blocks and/or five resource blocks in the narrowband includes:

when N is equal to 4, that the resource allocation field indicates resource allocation in the narrowband includes: the resource allocation field is only capable of indicating resource allocation of one of the two resource blocks, the three resource blocks, the four resource blocks, the five resource blocks, or the six resource blocks in the narrowband;

when N is equal to 4, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband; or when N is equal to 5, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband.

In a possible design of the fourth aspect, when N is equal to 4, and the resource allocation field is only capable of indicating the resource allocation of one of the two resource blocks, the three resource blocks, the four resource blocks, the five resource blocks, or the six resource blocks in the narrowband, the processing module is configured to: determine a second resource indicator value based on a determined resource used to send the first Msg3 or the second Msg3 and the uplink resource allocation type 0 used by the terminal device; determine a first resource indicator value based on the second resource indicator value, where a relationship between the first resource indicator value and the second resource indicator value meets a correspondence shown in the following formula: first resource indicator value=second resource indicator value−6; and determine the resource allocation field in the random access response grant, where the resource allocation field indicates the first resource indicator value, and the first resource indicator value is used to indicate the resource block allocated to the terminal device.

In a possible design of the fourth aspect, when N is equal to 4, and the resource allocation field is only capable of indicating the resource allocation of one of the two resource blocks, the three resource blocks, the four resource blocks, the five resource blocks, or the six resource blocks in the narrowband, the processing module is configured to: determine a third resource indicator value by using the following correspondence based on an allocated resource block quantity and an allocated start resource block index, where a correspondence between the third resource indicator value and both the allocated resource block quantity and the allocated start resource block index meets the correspondence shown in the following formula: when $(L_{CRBs}-2) \le \text{floor}((M-1)/2)$, the third resource indicator value is equal to $M(L_{CRBs}-2)+RB_{START}$; or when $(L_{CRBs}-2) > \text{floor}((M-1)/2)$, the third resource indicator value is equal to $M(M-L_{CRBs})+(M-1-RB_{START})$, where $M=6$, $L_{CRBs}$ is the allocated resource block quantity, $2 \le L_{CRBs} \le 6$, $RB_{START}$ is the allocated start resource block index, and floor represents rounding down; and determine the resource allocation field in the random access response grant, where the resource allocation field indicates the third resource indicator value, and the third resource indicator value is used to indicate the resource block allocated to the terminal device.

In a possible design of the fourth aspect, when N is equal to 4, and the resource allocation field is only capable of indicating the resource allocation of one of the two resource blocks, the three resource blocks, the four resource blocks, the five resource blocks, or the six resource blocks in the narrowband, the processing module is configured to: determine a fourth resource indicator value by using the following correspondence based on an allocated resource block quantity and an allocated start resource block index, where a correspondence between the fourth resource indicator value and both the allocated resource block quantity and the allocated start resource block index meets the correspondence shown in the following formula: when $(L_{CRBs}-2) \le \text{floor}(M/2)$, the fourth resource indicator value is equal to $M(L_{CRBs}-2)+RB_{START}$; or when $(L_{CRBs}-2) > \text{floor}(M/2)$, the fourth resource indicator value is equal to $M(M-L_{CRBs}+2)+(M-1-RB_{START})$, where $M=5$, $L_{CRBs}$ is the allocated resource block quantity, $2 \le L_{CRBs} \le 6$, $RB_{START}$ is the allocated start resource block index, and floor represents rounding down; and determine the resource allocation field in the random access response grant, where the resource allocation field indicates the fourth resource indicator value, and the fourth resource indicator value is used to indicate the resource block allocated to the terminal device.

In a possible design of the fourth aspect, when N is equal to 4, the resource allocation field is only capable of indicating resource allocation of the one resource block, the two resource blocks, the three resource blocks, the four resource blocks, the five resource blocks, or the six resource blocks in the narrowband, the resource allocation field indicates the one resource block in the narrowband; and only one of bit states of the resource allocation field is used to allocate the one resource block.

In a possible design of the fourth aspect, the processing module is configured to: determine a sixth resource indicator value based on a determined resource used to send the first Msg3 or the second Msg3 and the uplink resource allocation type 0 used by the terminal device; determine a fifth resource indicator value based on the sixth resource indicator value, where a relationship between the fifth resource indicator value and the sixth resource indicator value meets a correspondence shown in the following formula: fifth resource indicator value=sixth resource indicator value−5; and determine the resource allocation field in the random access response grant, where the resource allocation field indicates the fifth resource indicator value, and the fifth resource indicator value is used to indicate the resource block allocated to the terminal device.

In a possible design of the fourth aspect, the bit state is 0000, and an allocated start resource block index in the resource allocation field is 5.

In a possible design of the fourth aspect, the resource allocation field is further capable of indicating the resource allocation of the one resource block in the narrowband, and that the resource allocation field indicates resource allocation in the narrowband includes: the resource allocation field is only capable of indicating resource allocation of one of the one resource block, the two resource blocks, the three resource blocks, or the six resource blocks in the narrowband; and when the resource allocation field indicates the resource allocation of the one resource block in the narrowband, the network device determines that the allocated resource block is one resource block, and determines a size of a transport block for the second Msg3 based on K resource blocks, where K is a pre-specified positive integer greater than 1.

In a possible design of the fourth aspect, when N is equal to 4, and the resource allocation field is only capable of indicating the resource allocation of one of the two resource blocks, the three resource blocks, the four resource blocks, the five resource blocks, or the six resource blocks in the narrowband, the processing module is configured to determine a seventh resource indicator value by using the following correspondence based on an allocated resource block quantity and an allocated start resource block index, where a correspondence between the seventh resource indicator value and both the allocated resource block quantity and the allocated start resource block index meets the correspondence shown in the following formula:

when $(L_{CRBs}-1) \le \lfloor N_{RB}^{UL}/2 \rfloor$, the seventh resource indicator value is equal to $N_{RB}^{UL}(L_{CRBs}-2)+RB_{START}$; or when $(L_{CRBs}-1) > \lfloor N_{RB}^{UL}/2 \rfloor$, the seventh resource indicator value is equal to $N_{RB}^{UL}(N_{RB}^{UL}-L_{CRBs})+(N_{RB}^{UL}-1-RB_{START})$, where $N_{RB}^{UL}$ is equal to 6, $L_{CRBs}$ is the allocated resource block quantity, $2 \leq L_{CRBs} \leq 6$, $RB_{START}$ is the allocated start resource block index, and $\lfloor N_{RB}^{UL}/2 \rfloor$ represents rounding $N_{RB}^{UL}$ down.

In the fourth aspect of this application, the compositional modules of the network device may alternatively perform the steps described in the second aspect and the possible implementations. For details, refer to the foregoing descriptions of the second aspect and the possible implementations.

According to a fifth aspect, an embodiment of this application provides a computer-readable storage medium. The computer-readable storage medium stores an instruction. When the instruction is run on a computer, the computer is enabled to perform the methods in the foregoing aspects.

According to a sixth aspect, an embodiment of this application provides a computer program product including an instruction. When the computer program product runs on a computer, the computer is enabled to perform the methods in the foregoing aspects.

According to a seventh aspect, an embodiment of this application provides a communications apparatus. The communications apparatus may include an entity such as a terminal device, a network device, or a chip. The communications apparatus includes a processor and a memory. The memory is configured to store an instruction. The processor is configured to execute the instruction in the memory, so that the communications apparatus performs the method according to any one of the first aspect or second aspect.

According to an eighth aspect, this application provides a chip system. The chip system includes a processor, configured to support a network device or a terminal device in implementing the functions in the foregoing aspects, for example, sending or processing the data and/or the information in the foregoing methods. In a possible design, the chip system further includes a memory. The memory is configured to store a program instruction and data that are necessary for the network device. The chip system may include a chip, or may include a chip and another discrete component.

BRIEF DESCRIPTION OF DRAWINGS

FIG. 3-a is a schematic block flowchart of an information transmission method according to an embodiment of this application;

FIG. 3-b is a schematic diagram of resource indicator values corresponding to resource block quantities and start resource block indexes according to an embodiment of this application;

FIG. 3-c is another schematic diagram of resource indicator values corresponding to resource block quantities and start resource block indexes according to an embodiment of this application;

FIG. 4 is a schematic block flowchart of another information transmission method according to an embodiment of this application;

DESCRIPTION OF EMBODIMENTS

Figure 1:
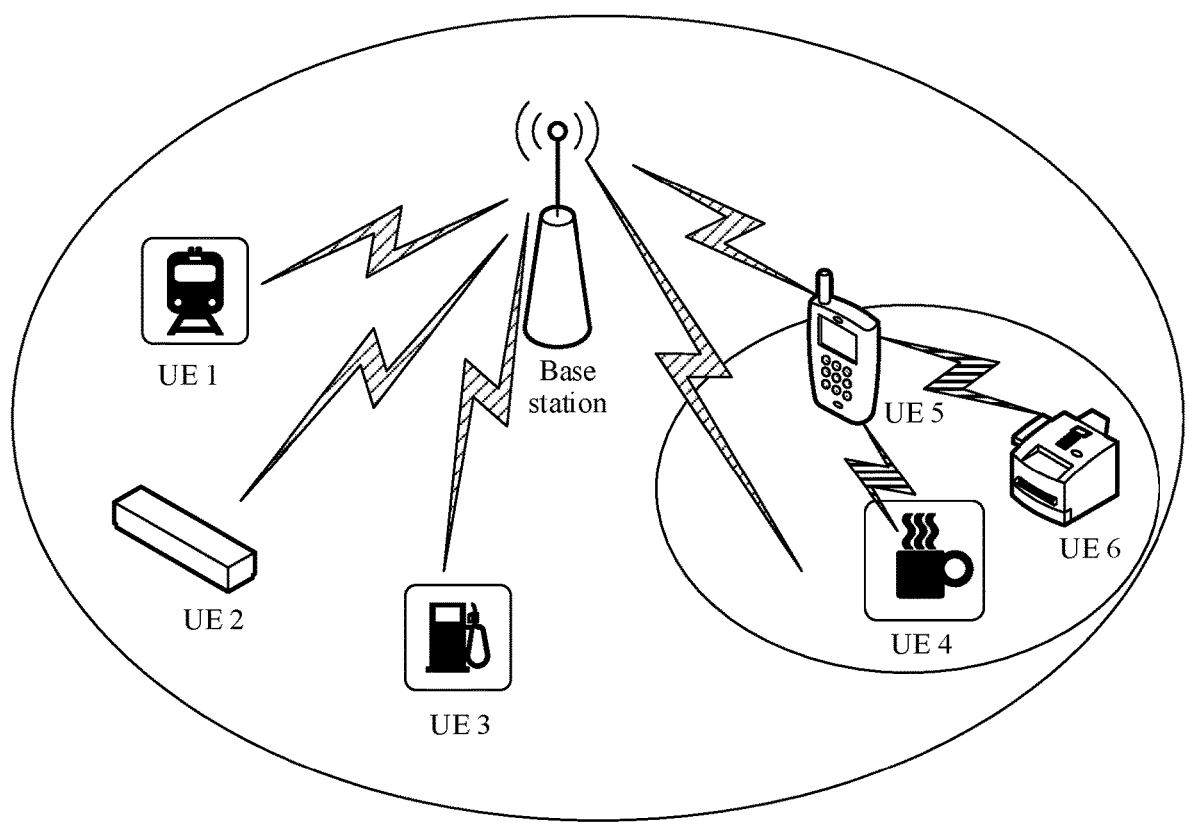
FIG. 1 is a schematic diagram of a system architecture of an information transmission method according to an embodiment of this application.

Embodiments of this application provide an information processing method and a device, so that a status on a network side can be considered as much as possible, and a waste of transmission resources can be avoided.

The following describes the embodiments of this application with reference to accompanying drawings.

In the specification, claims, and the accompanying drawings of this application, the terms "first", "second", and the like are intended to distinguish between similar objects but are not necessarily used to describe a specific order or sequence. It should be understood that, the terms used in such a way are interchangeable in proper circumstances, which is merely a discrimination manner used when objects having a same attribute are described in the embodiments of this application. In addition, the terms "include", "have" and any variant thereof mean to cover the non-exclusive inclusion, so that processes, methods, systems, products, or devices that include a series of units are not necessarily limited to those units, but may include other units not expressly listed or inherent to these processes, methods, systems, products, or devices.

The technical solutions in the embodiments of the present invention may be applied to various communications systems for data processing, for example, a code division multiple access (CDMA) system, a time division multiple access (TDMA) system, a frequency division multiple access (FDMA) system, an orthogonal frequency division multiple access (OFDMA) system, a single-carrier frequency division multiple access (single carrier FDMA, SC-FDMA) system, and another system. The terms "system" and "network" may be interchanged with each other. Wireless technologies such as universal terrestrial radio access (UTRA) and CDMA2000 may be implemented in the CDMA system. UTRA may include a wideband CDMA (WCDMA) technology and another variant technology of CDMA. CDMA2000 may cover interim standard (IS) 2000 (IS-2000), IS-95, and IS-856 standards. A wireless technology such as global system for mobile communications (GSM) may be implemented in the TDMA system Wireless technologies such as evolved universal terrestrial radio access (evolved UTRA, E-UTRA), ultra mobile broadband (UMB), IEEE 802.11 (Wi-Fi), IEEE 802.16 (WiMAX), IEEE 802.20, and Flash OFDM may be implemented in the OFDMA system. The UTRA and the E-UTRA are evolved versions of the UMTS. 3GPP is a new version of UMTS using E-UTRA in long term evolution (LTE) and various versions evolved based on LTE. A 5th generation (5 Generation, "5G" for short) communications system and a new radio (NR for short) system are next-generation communications systems that are under research. In addition, the communications system may alternatively be applicable to a future-oriented communications technology, which is applicable to the technical solutions provided in the embodiments of the present invention. A system architecture and a service scenario that are described in the embodiments of the present invention are intended to describe the technical solutions in the embodiments of the present invention more clearly, and do not constitute a limitation on the technical solutions provided in the embodiments of the present invention. A person of ordinary skill in the art may know that, with evolution of a network architecture and emergence of a new service scenario, the technical solutions provided in the embodiments of the present invention are also applicable to similar technical problems.

FIG. 1 is a schematic structural diagram of a possible radio access network (RAN for short) according to an embodiment of this application. The RAN may be a base station access system on a 2G network (to be specific, the RAN includes a base station and a base station controller), may be a base station access system on a 3G network (to be specific, the RAN includes a base station and an RNC), may be a base station access system on a 4G network (to be specific, the RAN includes an eNB and an RNC), or may be a base station access system on a 5G network.

The RAN includes one or more network devices 20. The network device 20 may be any type of device having a wireless transceiver function, or a chip disposed in a device having a wireless transceiver function. The network device 20 includes but is not limited to a base station (for example, a base station (BS), a NodeB, an evolved NodeB eNodeB or eNB, a gNodeB or gNB in a 5th generation 5G communications system, a base station in a future communications system, an access node in a Wi-Fi system, a wireless relay node, or a wireless backhaul node) and the like. The base station may be a macro base station, a micro base station, a picocell base station, a small cell, a relay station, or the like. A plurality of base stations may support a network using the foregoing one or more technologies or a future evolved network. A core network may support the network using the foregoing one or more technologies or the future evolved network. The base station may include one or more co-site or non-co-site transmission reception points (TRP). The network device 20 may alternatively be a radio controller, a central unit (centralized unit, CU), a distributed unit (DU), or the like in a cloud radio access network (CRAN) scenario. The network device may alternatively be a server, a wearable device, a vehicle-mounted device, or the like. That the network device 20 is a base station is used as an example for description below. The plurality of network devices 20 may be base stations of a same type or base stations of different types. The base station may communicate with terminal devices 1 to 6, or may communicate with terminal devices 1 to 6 by using a relay station. The terminal devices 1 to 6 may support communication with a plurality of base stations using different technologies. For example, the terminal device may support communication with a base station supporting an LTE network, may support communication with a base station supporting the 5G network, or may support a dual-connection to a base station supporting an LTE network and a base station supporting the 5G network. For example, the terminal is connected to a radio access network (RAN) node of a wireless network. Currently, for example, the RAN node is a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In a network structure, the network device may include a central unit (centralized unit, CU) node or a distributed unit (DU) node, or may be a RAN device including a CU node and a DU node.

The terminal devices 1 to 6 each are also referred to as user equipment (UE), a mobile station (MS), a mobile terminal (MT), a terminal, or the like. The terminal devices 1 to 6 each are a device that provides a voice and/or data connectivity for a user or a chip disposed in the device, for example, a handheld device or a vehicle-mounted device that has a wireless connection function. Currently, for example, the terminal device is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home.

In this embodiment of this application, a communications system includes the base station and the UE 1 to the UE 6. In the communications system, the base station sends one or more of system information, an RAR message, and a paging message to one or more of the UE 1 to the UE 6. In addition, a communications system also includes the UE 4 to the UE 6. In the communications system, the UE 5 may function as a base station. The UE 5 may send one or more of system information, control information, and a paging message to one or more of the UE 4 and the UE 6.

Figure 2:
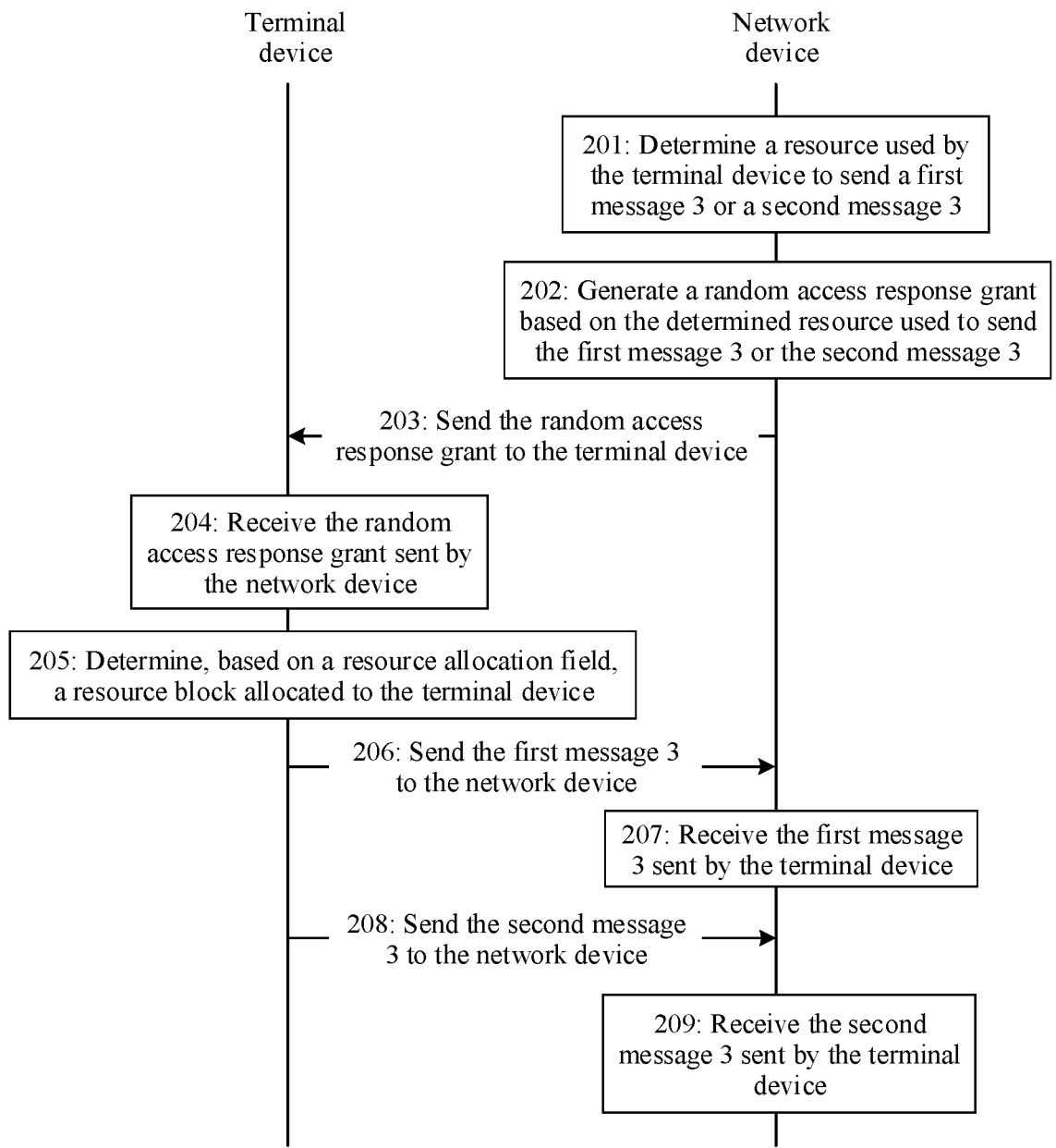
FIG. 2 is a schematic flowchart of interaction between a terminal device and a network device according to an embodiment of this application.

FIG. 2 is a schematic flowchart of interaction between a network device and a terminal device according to an embodiment of this application. The information processing method provided in the embodiments of this application mainly includes the following steps.

201: The network device determines a resource block that is allocated to a terminal device and that is used to send a first message 3 (Msg3) or a second message 3, where the second message 3 is used for data transmission.

The third message (namely, a message 3, which may also be referred to as an Msg3) in a random access process may carry user data. For example, the message 3 may support early data transmission (EDT). Corresponding resources may be configured for a plurality of types of messages that may be sent by the terminal device. For example, messages 3 in the random access process may be classified into at least two different types such as the first message 3 and the second message 3. Therefore, the terminal device may send two different messages 3, and the network device may configure corresponding resources for the different messages 3 that are sent. For example, the first message 3 may be a normal message 3, for example, a message 3 not for early data transmission. For example, the second message 3 is a message 3 for early data transmission. The data herein may be service data of the terminal device. For example, the network device allocates specific resources based on different messages 3 sent by the terminal device. For example, the network device may allocate, to the terminal device, a physical resource block (PRB) quantity used for the first message 3 and a start resource block index, or the network device may allocate, to the terminal device, a physical resource block quantity for the second message 3 and a start resource block index. In subsequent embodiments, a physical resource block may also be referred to as a resource block for short.

202: The network device determines a random access response grant, where the random access response grant includes a resource allocation field, and the resource allocation field indicates the resource block allocated to the terminal device.

After the network device determines to configure the resources for the different messages 3 sent by the terminal device, the network device needs to indicate resource configuration statuses for the different messages 3 to the terminal device, and the network device may generate the random access response grant. The random access response grant may also be referred to as an uplink grant (UL grant). The random access response grant may be used for scheduling of the message 3. The random access response grant includes the resource allocation field. The resource allocation field indicates the resource block allocated to the terminal device. The resource allocation field may be a message 3 physical uplink shared channel resource allocation (Msg3 PUSCH Resource allocation) field in the random access response grant.

Specifically, the random access response grant generated by the network device may be used for the scheduling of the message 3. When the random access response grant is used for scheduling of the different messages 3, the resource allocation field in the random access response grant may indicate different content. For example, when the random access response grant is used for scheduling of the first message 3, the resource allocation field includes four bits, the resource allocation field performs resource indication in narrowband based on an uplink resource allocation type 0, and the resource allocation field is capable of indicating resource allocation of one of one resource block, two resource blocks, three resource blocks, or six resource blocks in the narrowband; or when the random access response grant is used for scheduling of the second message 3, the resource allocation field includes N bits, where N is a positive integer, and the resource allocation field is at least capable of indicating resource allocation of one of two resource blocks, three resource blocks, or six resource blocks in narrowband.

For example, when the random access response grant is used for the scheduling of the first message 3, the resource allocation field includes the four bits, and is capable of indicating 16 states. To be specific, a resource indicator value (RIV) in an uplink resource allocation manner of the uplink resource allocation type 0 may be 0 to 15. The resource allocation field performs resource indication in the narrowband based on the uplink resource allocation type 0. The narrowband generally includes six consecutive resource blocks. The resource allocation field configured by the network device is capable of indicating the resource allocation of one of the one resource block, the two resource blocks, the three resource blocks, or the six resource blocks in the narrowband. Herein, "is capable of indicating" means that the resource allocation field may indicate resource allocation of one of the following resource block quantities: the one resource block, the two resource blocks, the three resource blocks, or the six resource blocks.

When the random access response grant is used for the scheduling of the second message 3, the resource allocation field includes the N bits, and a value of N may be determined based on a specific scenario of resource transmission. For example, N is a positive integer, and the value of N may be 4, 5, or the like. The resource allocation field configured by the network device is at least capable of indicating the resource allocation of one of the two resource blocks, the three resource blocks, or the six resource blocks in the narrowband. Herein, "is at least capable of indicating" means that the resource allocation field may indicate resource allocation of at least one of the following resource block quantities: the two resource blocks, the three resource blocks, or the six resource blocks. In addition, the resource allocation field is further capable of indicating resource allocation of another quantity of resource blocks. For example, the resource allocation field is further capable of indicating resource allocation of four resource blocks and/or five resource blocks in the narrowband, or the resource allocation field is further capable of indicating resource allocation of one resource block in the narrowband.

203: The network device sends the random access response grant to the terminal device.

After the network device determines the random access response grant, the network device may send the random access response grant to the terminal device. The random access response grant includes the resource allocation field. The resource allocation field indicates the resource block allocated to the terminal device.

204: The terminal receives the random access response grant sent by the network device.

The random access response grant includes the resource allocation field. The resource allocation field indicates the resource block allocated to the terminal device.

The terminal device first receives the random access response grant sent by the network device. For example, the terminal device receives, in a random access process, a media access control (MAC) random access response (RAR) message sent by the network device. The terminal device obtains the random access response grant from the MAC RAR message.

205: The terminal device determines, based on the resource allocation field, the resource block allocated to the terminal device.

After the terminal device receives the random access response grant, the terminal device obtains the resource allocation field from the random access response grant. It can be learned from the description of the resource allocation field configured by the network device in the foregoing content that the resource allocation field indicates resource blocks allocated by the network device for the different messages 3.

For example, when the random access response grant is used for the scheduling of the first message 3, the resource allocation field includes the four bits, the resource allocation field performs resource indication in the narrowband based on the uplink resource allocation type 0, and the resource allocation field is capable of indicating the resource allocation of one of the one resource block, the two resource blocks, the three resource blocks, or the six resource blocks in the narrowband; or when the random access response grant is used for the scheduling of the second message 3, the resource allocation field includes the N bits, where N is a positive integer, and the resource allocation field is at least capable of indicating the resource allocation of one of the two resource blocks, the three resource blocks, or the six resource blocks in the narrowband.

In this embodiment of this application, the terminal device may further determine, based on the obtained random access response grant, a message 3 scheduled by using the random access response grant. For different messages 3 scheduled by using the random access response grant, step 206 and step 208 may be respectively triggered to be performed in a subsequent embodiment.

206: When the random access response grant is used for the scheduling of the first message 3, the terminal device sends the first message 3 to the network device on the allocated resource block.

The terminal device may determine, by using the resource allocation field, a resource block allocated by the network device for the first message 3, and the terminal device sends the first message 3 by using the resource block.

207: When the random access response grant is used for the scheduling of the first message 3, the network device receives, on the allocated resource block, the first message 3 sent by the terminal device.

208: When the random access response grant is used for the scheduling of the second message 3, the terminal device sends the second message 3 to the network device on the allocated resource block.

The terminal device may determine, by using the resource allocation field, a resource block allocated by the network device for the second message 3, and the terminal device sends the second message 3 by using the resource block.

209: When the random access response grant is used for the scheduling of the second message 3, the network device receives, on the allocated resource block, the second message 3 sent by the terminal device.

It can be learned from the example description of this application in the foregoing embodiment that the network device allocates the corresponding resources for the different messages 3 that need to be scheduled, and uses the resource allocation field to indicate resource allocation statuses that occur when the different messages 3 are scheduled. Specifically, when the random access response grant is used for the scheduling of the first message 3, the resource allocation field includes the four bits, and the resource allocation field performs resource indication in the narrowband based on the uplink resource allocation type 0, and the resource allocation field is capable of indicating the resource allocation of one of the one resource block, the two resource blocks, the three resource blocks, or the six resource blocks in the narrowband. When the random access response grant is used for the scheduling of the second message 3, the resource allocation field includes the N bits, where N is a positive integer, and the resource allocation field is at least capable of indicating the resource allocation of one of the two resource blocks, the three resource blocks, or the six resource blocks in the narrowband. In this embodiment of this application, the network device allocates the specific resource blocks for the different messages 3 that need to be scheduled. For example, when the first message 3 is scheduled, the network device may perform resource allocation based on one of the one resource block, the two resource blocks, the three resource blocks, or the six resource blocks. When the second message 3 is scheduled, the network device may perform resource allocation based on one of the two resource blocks, the three resource blocks, or the six resource blocks. In this way, a resource allocation problem during scheduling of the different messages 3 is resolved. The terminal device may send the messages 3 based on the resource blocks allocated by the network device for the different messages 3. This improves resource utilization and a system capacity.

The following separately describes, from perspectives of a terminal device and a network device, the information processing method provided in the embodiments of this application. First, referring to FIG. 3-*a*, an embodiment of this application provides an information processing method, including the following steps.

301: The terminal device receives a random access response grant sent by the network device, where the random access response grant includes a resource allocation field, and the resource allocation field indicates a resource block allocated to the terminal device, where when the random access response grant is used for scheduling of a first message 3, the resource allocation field includes four bits, the resource allocation field performs resource indication in narrowband based on an uplink resource allocation type 0, and the resource allocation field is capable of indicating resource allocation of one of one resource block, two resource blocks, three resource blocks, or six resource blocks in the narrowband; or when the random access response grant is used for scheduling of a second message 3, the resource allocation field includes N bits, where N is a positive integer, and the resource allocation field is at least capable of indicating resource allocation of one of two resource blocks, three resource blocks, or six resource blocks in narrowband.

For example, FIG. 3-*b* is a schematic diagram of resource indicator values corresponding to resource block quantities and start resource block indexes according to this embodiment of this application. When the random access response grant is used for the scheduling of the first message 3, the resource allocation field includes four bits, and is capable of indicating 16 states. To be specific, a RIV in an uplink resource allocation manner of the uplink resource allocation type 0 may be 0 to 15. A PRB quantity that is for a Msg3 and that may be supported when the terminal device uses a Mode A is 1, 2, 3 and 6. As shown in FIG. 3-*c*, because a "Msg3 PUSCH Resource allocation" field includes only four bits, 16 states, namely, RIVs 0 to 15, can be indicated.

For another example, when the random access response grant is used for the scheduling of the second message 3, the resource allocation field includes the N bits. A value of N may be determined based on a scenario. For example, the value of N is 4 or 5. The resource allocation field is at least capable of indicating the resource allocation of one of the two resource blocks, the three resource blocks, or the six resource blocks in the narrowband. For example, when the network device schedules the second message 3, the resource allocation field may indicate allocation of four resource blocks in the narrowband, but does not indicate one resource block. Because the second message 3 carries uplink data, fewer resources (for example, one resource block) are not conducive to data transmission. In this way, a possibility of resource allocation can be reduced, and spectrum efficiency, a data transmission rate, and a system capacity can be improved.

Optionally, in some embodiments of this application, when the random access response grant is used for the scheduling of the second message 3, the resource allocation field is further capable of indicating resource allocation of four resource blocks and/or five resource blocks in the narrowband; or the resource allocation field is further capable of indicating resource allocation of one resource block in the narrowband.

When the random access response grant is used for the scheduling of the second message 3, "is further capable of indicating" herein means that in addition to being capable of indicating the resource allocation of one of the two resource blocks, the three resource blocks, or the six resource blocks, the resource allocation field is further capable of indicate resource allocation of the four resource blocks, further capable of indicate resource allocation of the five resource blocks, or further capable of indicate resource allocation of one of the four resource blocks or the five resource blocks. In addition, when the random access response grant is used for the scheduling of the second message 3, in addition to indicating the resource allocation of one of the two resource blocks, the three resource blocks, or the six resource blocks, the resource allocation field may further indicate the resource allocation of the one resource block in the narrowband. A quantity, of resource blocks indicated by the resource allocation field, configured by the network device may be determined based on an application scenario. For example, the network device determines the quantity based on current network load.

Optionally, in some embodiments of this application, that the resource allocation field is further capable of indicating resource allocation of four resource blocks and/or five resource blocks in the narrowband includes:

when N is equal to 4, that the resource allocation field indicates resource allocation in the narrowband includes: the resource allocation field is only capable of indicating resource allocation of one of the two resource blocks, the three resource blocks, the four resource blocks, the five resource blocks, or the six resource blocks in the narrowband;

when N is equal to 4, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband; or when N is equal to 5, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband.

The resource allocation field may occupy four bits in the random access response grant. When a Msg3 supports EDT, the resource allocation field may be a "Msg3 PUSCH Resource allocation" field in a UL grant in a MAC RAR. For example, the resource allocation field occupies four bits. The resource allocation field is only capable of indicating the resource allocation of one of the two resource blocks, the three resource blocks, the four resource blocks, the five resource blocks, or the six resource blocks in the narrowband. "Is only capable of indicating" means that a resource block quantity allocated by the network device is only capable of being selected from the two resource blocks, the three resource blocks, the four resource blocks, the five resource blocks, or the six resource blocks in the narrowband. When N is equal to 4, the resource allocation field is only capable of indicating the resource allocation of one of the one resource block, the two resource blocks, the three resource blocks, the four resource blocks, the five resource blocks, or the six resource blocks in the narrowband. "Is only capable of indicating" means that a resource block quantity allocated by the network device is only capable of being selected from the one resource block, the two resource blocks, the three resource blocks, the four resource blocks, the five resource blocks, or the six resource blocks in the narrowband. Similarly, the resource allocation field may alternatively occupy five bits. When N is equal to 5, the resource allocation field performs resource indication in the narrowband based on the uplink resource allocation type 0. In this embodiment of this application, when different bits are configured for the resource allocation field, a specific quantity of resource blocks may be indicated. The network device may indicate a specific quantity of allocated resource blocks by using a bit value of the resource allocation field, so that the terminal device determines, by parsing the bit value of the resource allocation field, a resource block quantity allocated by the network device for the second message 3, and uplink transmission of the second message 3 is ensured.

302: The terminal device determines, based on the resource allocation field, the resource block allocated to the terminal device.

After obtaining the random access response grant, the terminal device parses the resource allocation field included in the random access response grant, to determine the resource block allocated by the network device to the terminal device. For different messages 3 scheduled by using the random access response grant, the network device may allocate corresponding resources.

Further, in some embodiments of this application, when N is equal to 4, and the resource allocation field is only capable of indicating the resource allocation of one of the two resource blocks, the three resource blocks, the four resource blocks, the five resource blocks, or the six resource blocks in the narrowband, that the terminal device determines, based on the resource allocation field, the resource block allocated to the terminal device in step 302 includes:

determining, by the terminal device, a first resource indicator value based on the resource allocation field;

determining, by the terminal device, a second resource indicator value based on the first resource indicator value, where a relationship between the first resource indicator value and the second resource indicator value meets a correspondence shown in the following formula:

second resource indicator value=first resource indicator value+6; and determining, by the terminal device based on the second resource indicator value and the uplink resource allocation type 0, the resource block allocated to the terminal device.

The resource allocation field may indicate resource allocation solutions of a total of five lengths, namely, a resource block quantity 2, 3, 4, 5, and 6, and a remaining state is unused. For example, if the second resource indicator value is represented by RIV_EDT, RIV_EDT=6 to 20, and the first resource indicator value is represented by RIV_legacy, RIV_EDT=RIV_legacy+6. When a base station schedules UE that supports EDT to early send data by using the Msg3, "Msg3 PUSCH Resource allocation" in the UL grant in the MAC RAR indicates RIV_legacy. However, when the UE interprets a UL grant that supports EDT, actual RIV_EDT is 6 plus a RIV_legacy value indicated by using four bits. For example, the base station indicates, in the UL grant, that a RIV value is 12, and a RIV value received by the UE is also 12. When RIV_EDT is actually used for a Msg3 for EDT, a value of RIV_EDT is 18. The UE determines the allocated resource based on RIV_EDT.

In this embodiment of this application, when the terminal device uses the Mode A, one or more or all of six states indicating resource allocation of one PRB are used to indicate four PRBs and five PRBs. In this way, DCI overheads are not additionally increased. The base station and a UE side may perform a mapping relationship between RIV_EDT and RIV_legacy. In this embodiment of this application, for a large TBS, the network device may allocate fewer than six PRBs. For example, the network device may allocate four or five PRBs to the UE to transmit the second message 3, so that resource allocation of four PRBs and five PRBs is supported in the Mode A, resource utilization is improved, a system capacity is improved, and scheduling flexibility of the base station is improved.

Further, in some embodiments of this application, when N is equal to 4, and the resource allocation field is only capable of indicating the resource allocation of one of the two resource blocks, the three resource blocks, the four resource blocks, the five resource blocks, or the six resource blocks in the narrowband, that the terminal device determines, based on the resource allocation field, the resource block allocated to the terminal device in step 302 includes:

determining, by the terminal device, an allocated resource block quantity and an allocated start resource block index by using the following correspondence based on a third resource indicator value indicated by the resource allocation field, where a correspondence between the third resource indicator value indicated by the resource allocation field and both the allocated resource block quantity and the allocated start resource block index meets the correspondence shown in the following formula:

when $(L_{CRBs}-2) \leq \text{floor}((M-1)/2)$, the third resource indicator value is equal to $M(L_{CRBs}-2)+RB_{START}$; or when $(L_{CRBs}-2) > \text{floor}((M-1)/2)$, the third resource indicator value is equal to $M(M-L_{CRBs})+(M-1-RB_{START})$, where $M=6$, $L_{CRBs}$ is the allocated resource block quantity, $2 \leq L_{CRBs} \leq 6$, $RB_{START}$ is the allocated start resource block index, and floor represents rounding down.

It should be noted that the network device indicates the third resource indicator value to the terminal device by using the resource allocation field, and the terminal device may determine, with reference to the foregoing formulas by using the third resource indicator value, the resource block quantity and the start resource block index that are allocated by the network device. "Meets" in "a correspondence between the third resource indicator value and both the allocated resource block quantity and the allocated start resource block index meets the correspondence shown in the following formula" is not limited to a same representation form, and for example, may alternatively be in a form such as a table. The formulas used in the foregoing embodiment are merely an implementation. Equivalent variations based on the formulas may alternatively be used to calculate the third resource indicator value. This is not limited herein.

Further, in some embodiments of this application, when N is equal to 4, and the resource allocation field is only capable of indicating the resource allocation of one of the two resource blocks, the three resource blocks, the four resource blocks, the five resource blocks, or the six resource blocks in the narrowband, that the terminal device determines, based on the resource allocation field, the resource block allocated to the terminal device in step 302 includes:

determining, by the terminal device, an allocated resource block quantity and an allocated start resource block index by using the following correspondence based on a fourth resource indicator value indicated by the resource allocation field, where a correspondence between the fourth resource indicator value indicated by the resource allocation field and both the allocated resource block quantity and the allocated start resource block index meets the correspondence shown in the following formula:

when $(L_{CRBs}-2) \leq \text{floor}(M/2)$, the fourth resource indicator value is equal to $M(L_{CRBs}-2)+RB_{START}$; or when $(L_{CRBs}-2) > \text{floor}(M/2)$, the fourth resource indicator value is equal to $M(M-L_{CRBs}+2)+(M-1-RB_{START})$, where $M=5$, $L_{CRBs}$ is the allocated resource block quantity, $2 \leq L_{CRBs} \leq 6$, $RB_{START}$ is the allocated start resource block index, and floor represents rounding down.

It should be noted that the network device indicates the fourth resource indicator value to the terminal device by using the resource allocation field, and the terminal device may determine, with reference to the foregoing formulas by using the fourth resource indicator value, the resource block quantity and the start resource block index that are allocated by the network device. "Meets" in "a correspondence between the fourth resource indicator value and both the allocated resource block quantity and the allocated start resource block index meets the correspondence shown in the following formula" is not limited to a same representation form, and for example, may alternatively be in a form such as a table. The formulas used in the foregoing embodiment are merely an implementation. Equivalent variations based on the formulas may alternatively be used to calculate the third resource indicator value. This is not limited herein.

Further, in some embodiments of this application, when N is equal to 4, and the resource allocation field is only capable of indicating resource allocation of the one resource block, the two resource blocks, the three resource blocks, the four resource blocks, the five resource blocks, or the six resource blocks in the narrowband, the resource allocation field indicates the one resource block in the narrowband; and only one of bit states of the resource allocation field is used to allocate the one resource block.

When the random access response grant is used for the scheduling of the second message 3, that the resource allocation field includes four bits is used as an example, and only one of all the bit states of the resource allocation field is capable of indicating that one resource block is allocated. For example, as shown in FIG. 3-b, when the quantity of resource blocks is 1, values of a RIV is 0, 1, 2, 3, 4, and 5. When the terminal device uses the Mode A, the network device may use one or more or all of the six states indicating the one PRB to indicate the four PRBs and the five PRBs. For example, if the network device uses five of the six states of one PRB to indicate the four PRBs and the five PRBs, one bit state still remains in the one PRB, and the remaining bit state may still be used to indicate one resource block. In this case, the resource allocation field provided in this embodiment of this application may be used to indicate the resource allocation of the one resource block, the two resource blocks, the three resource blocks, the four resource blocks, the five resource blocks, or the six resource blocks in the narrowband. To be specific, the network device may indicate the terminal device to transmit the second message 3 by using resource blocks of different sizes, to improve resource utilization and a system capacity.

Further, in some embodiments of this application, only the one of bit states of the resource allocation field is used to allocate the one resource block, that the terminal device determines, based on the resource allocation field, the resource block allocated to the terminal device in step 302 includes:

determining, by the terminal device, a fifth resource indicator value based on the resource allocation field;

determining, by the terminal device, a sixth resource indicator value based on the fifth resource indicator value, where a relationship between the fifth resource indicator value and the sixth resource indicator value meets a correspondence shown in the following formula:

sixth resource indicator value=fifth resource indicator value+5; and determining, by the terminal device, the allocated resource block based on the sixth resource indicator value and the uplink resource allocation type 0.

The resource allocation field indicates that one remaining state is used to indicate one PRB. For example, if the sixth resource indicator value is represented by RIV_EDT, RIV_EDT=5 to 20, and the fifth resource indicator value is represented by RIV_legacy, RIV_EDT=RIV_legacy+5. When RIV_legacy=0, RIV_EDT=5, and a corresponding PRB quantity is 1.

Further, in some embodiments of this application, only the one bit state is 0000, and an allocated start resource block index in the resource allocation field is 5. Another bit state of the resource allocation field may alternatively be used to indicate one resource block. For example, only one bit state 1111 is used to indicate one resource block. This is not limited herein.

Further, in some embodiments of this application, the resource allocation field is further capable of indicating the resource allocation of the one resource block in the narrowband, and that the resource allocation field indicates resource allocation in the narrowband includes: the resource allocation field is only capable of indicating resource allocation of one of the one resource block, the two resource blocks, the three resource blocks, or the six resource blocks in the narrowband. That the terminal device determines the allocated resource block based on the resource allocation field in step 302 includes:

when the resource allocation field indicates the resource allocation of the one resource block in the narrowband, determining, by the terminal device, that the allocated resource block is one resource block, and determining a size of a transport block for the second message 3 based on K resource blocks, where K is a pre-specified positive integer greater than 1. In this way, the terminal can determine a larger TBS, which helps support transmission of a larger data block, and improves transmission flexibility of the second message 3.

The network device may indicate allocation of one resource block by using the resource allocation field. In this case, the terminal device may determine, by parsing the resource allocation field, that the network device allocates one resource block for the second message 3. In this case, a size of a transport block for the second message 3 that needs to be sent by the terminal device is no longer determined based on the one resource block indicated by the network device. Instead, the size of the transport block for the second message 3 is determined by using the K resource blocks. K is a pre-specified positive integer greater than 1. A value of K may be determined based on an application scenario, and for example, may be determined based on a size of a message 3 encoded by the terminal device. Alternatively, the terminal device determines a value of K according to an indication of the network device.

In this embodiment of this application, the terminal device may further determine, based on the obtained random access response grant, a message 3 scheduled by using the random access response grant. For different messages 3 scheduled by using the random access response grant, step 303 and step 308 may be respectively triggered to be performed in a subsequent embodiment.

303: When the random access response grant is used for the scheduling of the first message 3, the terminal device sends the first message 3 to the network device on the allocated resource block.

304: When the random access response grant is used for the scheduling of the second message 3, the terminal device sends the second message 3 to the network device on the allocated resource block.

In some embodiments of this application, when N is equal to 4, and the resource allocation field is only capable of indicating the resource allocation of one of the two resource blocks, the three resource blocks, the four resource blocks, the five resource blocks, or the six resource blocks in the narrowband, that the terminal device determines, based on the resource allocation field, the resource block allocated to the terminal device includes:

determining, by the terminal device, an allocated resource block quantity and an allocated start resource block index by using the following correspondence based on a seventh resource indicator value indicated by the resource allocation field, where a correspondence between the seventh resource indicator value indicated by the resource allocation field and both the allocated resource block quantity and the allocated start resource block index meets the correspondence shown in the following formula:

when $(L_{CRBs}-1) \leq \lfloor N_{RB}^{UL}/2 \rfloor$, the seventh resource indicator value is equal to $N_{RB}^{UL}(L_{CRBs}-2)+RB_{START}$; or when $(L_{CRBs}-1) > \lfloor N_{RB}^{UL}/2 \rfloor$, the seventh resource indicator value is equal to $N_{RB}^{UL}(N_{RB}^{UL}-L_{CRBs})+(N_{RB}^{UL}-1-RB_{START})$, where $N_{RB}^{UL}$ is equal to 6, $L_{CRBs}$ is the allocated resource block quantity, $2 \leq L_{CRBs} \leq 6$, $RB_{START}$ is the allocated start resource block index, and $\lfloor N_{RB}^{UL}/2 \rfloor$ represents rounding $N_{RB}^{UL}$ down.

FIG. 3-*c* is another schematic diagram of resource indicator values corresponding to resource block quantities and start resource block indexes according to this embodiment of this application. For example, the following formulas are used to support resource allocation of two to six resource blocks. A specific correspondence between a RIV value and both a start point and a length is shown in the following formulas.

If $(L_{CRBs}-1) \leq \lfloor N_{RB}^{UL}/2 \rfloor$, $RIV = N_{RB}^{UL}(L_{CRBs}-2)+RB_{START}$.

Otherwise, $RIV = N_{RB}^{UL}(N_{RB}^{UL}-L_{CRBs})+(N_{RB}^{UL}-1-RB_{START})$ where $N_{RB}^{UL}=6$ In some embodiments of this application, when N is equal to 4, and the resource allocation field is only capable of indicating the resource allocation of one of the two resource blocks, the three resource blocks, the four resource blocks, the five resource blocks, or the six resource blocks in the narrowband, that the terminal device determines, based on the resource allocation field, the resource block allocated to the terminal device includes:

a mapping relationship between both a start position of the resource block and a resource block quantity and a resource indicator value RIV meets a mapping relationship in the following table:

| Length (RB) | Mapping relationship between a RIV and a starting point |
|---|---|
| 2 | RIV values 0 to 4 correspond to in starting points 0 to 4 in narrowband |
| 3 | RIV values 6 to 9 correspond to the starting points 0 to 3 in the narrowband |
| 4 | RIV values 12 to 14 correspond to the starting points 0 to 2 in the narrowband |
| 5 | RIV values 10 and 11 correspond to the starting points 1 and 0 in the narrowband |
| 6 | A RIV value 5 corresponds to the starting point 0 in the narrowband |

In some embodiments of this application, when N is equal to 4, and the resource allocation field is only capable of indicating the resource allocation of one of the two resource blocks, the three resource blocks, the four resource blocks, the five resource blocks, or the six resource blocks in the narrowband.

The four bits correspond to 16 bit states. Fourteen bit states indicate fourteen types of resource allocations. Resource allocation, of two, three, four, five, or six consecutive resource blocks in the narrowband, included in the fourteen types of resource allocation are specifically: 0 and 1; 1 and 2; 2 and 3; 3 and 4; 4 and 5; 0, 1, and 2; 1, 2, and 3; 2, 3, and 4; 3, 4, and 5; 0, 1, 2, and 3; 1, 2, 3, and 4; 2, 3, 4, and 5; 0, 1, 2, 3, and 4; 1, 2, 3, 4, and 5; and 0, 1, 2, 3, 4, and 5. 0, 1, 2, 3, 4, and 5 represent resource block indexes in the narrowband.

For another example, the four bits correspond to 16 bit states. Fifteen bit states indicate fifteen types of resource allocation. Resource allocation, of one, two, three, four, five, or six consecutive resource blocks in the narrowband, included in the fifteen types of resource allocation are specifically: 0 or 5; 0 and 1; 1 and 2; 2 and 3; 3 and 4; 4 and 5; 0, 1, and 2; 1, 2, and 3; 2, 3, and 4; 3, 4, and 5; 0, 1, 2, and 3; 1, 2, 3, and 4; 2, 3, 4, and 5; 0, 1, 2, and 4; 1, 2, 3, 4, and 5; and 0, 1, 2, 3, 4, and 5. 0, 1, 2, 3, 4, and 5 represent resource block indexes in the narrowband.

It can be learned from the example description of this application in the foregoing embodiment that the network device allocates the corresponding resources for the different messages 3 that need to be scheduled, and uses the resource allocation field to indicate resource allocation statuses that occur when the different messages 3 are scheduled. Specifically, when the random access response grant is used for the scheduling of the first message 3, the resource allocation field includes the four bits, the resource allocation field performs resource indication in the narrowband based on the uplink resource allocation type 0, and the resource allocation field is capable of indicating the resource allocation of one of the one resource block, the two resource blocks, the three resource blocks, or the six resource blocks in the narrowband; or when the random access response grant is used for the scheduling of the second message 3, the resource allocation field includes the N bits, where N is a positive integer, and the resource allocation field is at least capable of indicating the resource allocation of one of the two resource blocks, the three resource blocks, or the six resource blocks in the narrowband. In this embodiment of this application, the network device allocates the specific resource blocks for the different messages 3 that need to be scheduled. For example, when the first message 3 is scheduled, the network device may perform resource allocation based on one of the one resource block, the two resource blocks, the three resource blocks, or the six resource blocks. When the second message 3 is scheduled, the network device may perform resource allocation based on one of the two resource blocks, the three resource blocks, or the six resource blocks. In this way, a resource allocation problem during scheduling of the different messages 3 is resolved. The terminal device may send the messages 3 based on the resource blocks allocated by the network device for the different messages 3. This improves resource utilization and a system capacity.

The foregoing embodiment describes, from a perspective of the terminal device, the information processing method provided in the embodiments of this application. The following describes, from a perspective of the network device, the information processing method provided in the embodiments of this application. Referring to FIG. 4, an embodiment of this application provides an information processing method, including the following steps.

401: The network device determines a resource block that is allocated to the terminal device and that is used to send a first message 3 or a second message 3, where the second message 3 is used for data transmission.

A message 3 in a random access process may carry user data. The message 3 may support EDT. Corresponding resources may be configured for a plurality of types of messages that may be sent by the terminal device. For example, messages 3 in the random access process may be classified into at least two different types such as the first message 3 and the second message 3. Therefore, the terminal device may send two different messages 3, and the network device may configure corresponding resources for the different messages 3 that are sent.

402: The network device generates a random access response grant based on a determined resource used to send the first message 3 or the second message 3, where the random access response grant includes a resource allocation field, and the resource allocation field indicates the resource block allocated to the terminal device.

When the random access response grant is used for scheduling of the first message 3, the resource allocation field includes four bits, the resource allocation field performs resource indication in narrowband based on an uplink resource allocation type 0, and the resource allocation field is capable of indicating resource allocation of one of one resource block, two resource blocks, three resource blocks, or six resource blocks in the narrowband; or when the random access response grant is used for scheduling of the second message 3, the resource allocation field includes N bits, where N is a positive integer, and the resource allocation field is at least capable of indicating resource allocation of one of two resource blocks, three resource blocks, or six resource blocks in narrowband.

In some embodiments of this application, when the random access response grant is used for the scheduling of the second message 3, the resource allocation field is further capable of indicating resource allocation of four resource blocks and/or five resource blocks in the narrowband; or the resource allocation field is further capable of indicating resource allocation of one resource block in the narrowband.

In some embodiments of this application, that the resource allocation field is further capable of indicating resource allocation of four resource blocks and/or five resource blocks in the narrowband includes:

when N is equal to 4, that the resource allocation field indicates resource allocation in the narrowband includes: the resource allocation field is only capable of indicating resource allocation of one of the two resource blocks, the three resource blocks, the four resource blocks, the five resource blocks, or the six resource blocks in the narrowband;

when N is equal to 4, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband; or when N is equal to 5, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband.

In some embodiments of this application, when N is equal to 4, and the resource allocation field is only capable of indicating the resource allocation of one of the two resource blocks, the three resource blocks, the four resource blocks, the five resource blocks, or the six resource blocks in the narrowband, that the network device generates a random access response grant based on a determined resource used to send the first message 3 or the second message 3 in step 402 includes:

determining, by the network device, a second resource indicator value based on the determined resource used to send the first message 3 or the second message 3 and the uplink resource allocation type 0 used by the terminal device;

determining, by the network device, a first resource indicator value based on the second resource indicator value, where a relationship between the first resource indicator value and the second resource indicator value meets a correspondence shown in the following formula:

first resource indicator value=second resource indicator value−6; and determining, by the network device, the resource allocation field in the random access response grant, where the resource allocation field indicates the first resource indicator value, and the first resource indicator value is used to indicate the resource block allocated to the terminal device.

In some embodiments of this application, when N is equal to 4, and the resource allocation field is only capable of indicating the resource allocation of one of the two resource blocks, the three resource blocks, the four resource blocks, the five resource blocks, or the six resource blocks in the narrowband, that the network device generates a random access response grant based on a determined resource used to send the first message 3 or the second message 3 in step 402 includes:

determining, by the network device, a third resource indicator value by using the following correspondence based on an allocated resource block quantity and an allocated start resource block index, where a correspondence between the third resource indicator value and both the allocated resource block quantity and the allocated start resource block index meets the correspondence shown in the following formula:

when $(L_{CRBs}-2) \leq \text{floor}((M-1)/2)$, the third resource indicator value is equal to $M(L_{CRBs}-2)+RB_{START}$; or when $(L_{CRBs}-2) > \text{floor}((M-1)/2)$, the third resource indicator value is equal to $M(M-L_{CRBs})\pm(M-1-RB_{START})$, where $M=6$, $L_{CRBs}$ is the allocated resource block quantity, $2 \leq L_{CRBs} \leq 6$, $RB_{START}$ is the allocated start resource block index, and floor represents rounding down; and determining, by the network device, the resource allocation field in the random access response grant, where the resource allocation field indicates the third resource indicator value, and the third resource indicator value is used to indicate the resource block allocated to the terminal device.

In some embodiments of this application, when N is equal to 4, and the resource allocation field is only capable of indicating the resource allocation of one of the two resource blocks, the three resource blocks, the four resource blocks, the five resource blocks, or the six resource blocks in the narrowband, that the network device generates a random access response grant based on a determined resource used to send the first message 3 or the second message 3 in step 402 includes:

determining, by the network device, a fourth resource indicator value by using the following correspondence based on an allocated resource block quantity and an allocated start resource block index, where a correspondence between the fourth resource indicator value and both the allocated resource block quantity and the allocated start resource block index meets the correspondence shown in the following formula:

when $(L_{CRBs}-2) \leq \text{floor}(M/2)$, the fourth resource indicator value is equal to $M(L_{CRBs}-2)+RB_{START}$; or when $(L_{CRBs}-2) > \text{floor}(M/2)$, the fourth resource indicator value is equal to $M(M-L_{CRBs}+2)+(M-1-RB_{START})$, where $M=5$, $L_{CRBs}$ is the allocated resource block quantity, $2 \leq L_{CRBs} \leq 6$, $RB_{START}$ is the allocated start resource block index, and floor represents rounding down; and determining, by the network device, the resource allocation field in the random access response grant, where the resource allocation field indicates the fourth resource indicator value, and the fourth resource indicator value is used to indicate the resource block allocated to the terminal device.

In some embodiments of this application, when N is equal to 4, the resource allocation field is only capable of indicating resource allocation of the one resource block, the two resource blocks, the three resource blocks, the four resource blocks, the five resource blocks, or the six resource blocks in the narrowband, only one of bit states of the resource allocation field is used to allocate the one resource block.

Further, in some embodiments of this application, that the network device generates a random access response grant based on a determined resource used to send the first message 3 or the second message 3 in step 402 includes:

determining, by the network device, a sixth resource indicator value based on the determined resource used to send the first message 3 or the second message 3 and the uplink resource allocation type 0 used by the terminal device;

determining, by the network device, a fifth resource indicator value based on the sixth resource indicator value, where a relationship between the fifth resource indicator value and the sixth resource indicator value meets a correspondence shown in the following formula:

fifth resource indicator value=sixth resource indicator value−5; and determining, by the network device, the resource allocation field in the random access response grant, where the resource allocation field indicates the fifth resource indicator value, and the fifth resource indicator value is used to indicate the resource block allocated to the terminal device.

In some embodiments of this application, the bit state is 0000, and an allocated start resource block index in the resource allocation field is 5.

In some embodiments of this application, the resource allocation field is further capable of indicating the resource allocation of the one resource block in the narrowband, and that the resource allocation field indicates resource allocation in the narrowband includes: the resource allocation field is only capable of indicating resource allocation of one of the one resource block, the two resource blocks, the three resource blocks, or the six resource blocks in the narrowband.

When the resource allocation field indicates the resource allocation of the one resource block in the narrowband, the network device determines that the allocated resource block is one resource block, and determines a size of a transport block for the second message 3 based on K resource blocks, where K is a pre-specified positive integer greater than 1.

403: The network device sends the random access response grant to the terminal device.

In this embodiment of this application, for different messages 3 scheduled by using the random access response grant, step 404 and step 405 may be respectively triggered to be performed in a subsequent embodiment.

404: When the random access response grant is used for the scheduling of the first message 3, the network device receives, on the allocated resource block, the first message 3 sent by the terminal device.

405: When the random access response grant is used for the scheduling of the second message 3, the network device receives, on the allocated resource block, the second message 3 sent by the terminal device.

It can be learned from the example description of this application in the foregoing embodiment that the network device allocates the corresponding resources for the different messages 3 that need to be scheduled, and uses the resource allocation field to indicate resource allocation statuses that occur when the different messages 3 are scheduled. Specifically, when the random access response grant is used for the scheduling of the first message 3, the resource allocation field includes the four bits, the resource allocation field performs resource indication in the narrowband based on the uplink resource allocation type 0, and the resource allocation field is capable of indicating the resource allocation of one of the one resource block, the two resource blocks, the three resource blocks, or the six resource blocks in the narrowband; or when the random access response grant is used for the scheduling of the second message 3, the resource allocation field includes the N bits, where N is a positive integer, and the resource allocation field is at least capable of indicating the resource allocation of one of the two resource blocks, the three resource blocks, or the six resource blocks in the narrowband. In this embodiment of this application, the network device allocates the specific resource blocks for the different messages 3 that need to be scheduled. For example, when the first message 3 is scheduled, the network device may perform resource allocation based on the one resource block, the two resource blocks, the three resource blocks, or the six resource blocks. When the second message 3 is scheduled, the network device may perform resource allocation based on the two resource blocks, the three resource blocks, or the six resource blocks. In this way, a resource allocation problem during scheduling of the different messages 3 is resolved. The terminal device may send the messages 3 based on the resource blocks allocated by the network device for the different messages 3. This improves resource utilization and a system capacity.

An embodiment of this application further provides an information processing method. The information processing method includes:

receiving, by a terminal device, a random access response grant sent by a network device, where the random access response grant includes an indication field, and the indication field is used to indicate to-be-scheduled indication information;

determining, by the terminal device based on the indication field, a Msg3 scheduled by the network device; and sending, by the terminal device, the Msg3 to the network device.

The network device generates the random access response grant. The network device determines a message 3 that may be sent by the terminal device. The network device indicates, by using the indication field in the random access response grant, to schedule different messages. For example, the indication field may indicate to schedule a first message 3 or a second message 3. In this case, the terminal device determines, based on the indication field configured by the network device, the Msg3 that needs to be scheduled, so that the terminal device may send the message 3 of a specified type according to a requirement of the network device.

In some embodiments of this application, the terminal device is at a coverage enhancement level 0, a coverage enhancement level 1, or a coverage enhancement mode A; and when the random access response grant is used to schedule the Msg3, the random access response grant does not include one or more of a channel state information request field, an uplink delay field, a modulation and coding scheme field, or a repetition quantity field;

a quantity of zero padding bits in the random access response grant is less than (4−M), where M is equal to a bit quantity of a narrowband index that indicates the Msg3 and that is in the random access response grant;

a quantity of bits of a modulation and coding scheme field in the random access response grant is less than 3;

a quantity of bits of a repetition quantity field in the random access response grant is less than 2;

a quantity of bits of a transmit power control field in the random access response grant is less than 3; and/or a quantity of bits of a message 3 or message 4 control channel narrowband index field in the random access response grant is less than 2.

The random access response grant does not include one or more of the channel state information request field, the uplink delay field, the modulation and coding scheme field, or the repetition quantity field. Therefore, the random access response grant may include the indication field, an original message length of the random access response grant is not increased, which has a backward compatibility feature. For another example, the network device may reduce an original bit quantity of the modulation and coding scheme field, the repetition quantity field, the transmit power control field, the message 3 or message 4 control channel narrowband index field in the random access response grant, to use the random access response grant to carry the indication field.

In some embodiments of this application, the terminal device is at a coverage enhancement level 2, a coverage enhancement level 3, or a coverage enhancement mode B; and when the random access response grant is used to schedule the Msg3, the random access response grant does not include one or more of a transport block size field, an uplink delay field, or a repetition quantity field;

a bit quantity of a transport block size field in the random access response grant is less than 2;

a bit quantity of a repetition quantity field in the random access response grant is less than 3; and/or a bit quantity of a message 3 or message 4 control channel narrowband index field in the random access response grant is less than 2.

In some embodiments of this application, when a bit state of the indication field belongs to a first bit state set, the random access response grant is used to schedule the first message 3; or when a bit state of the indication field belongs to a second bit state set, the random access response grant is used to schedule the Msg3. The indication field is one or more of a modulation and coding scheme field, a message 3 or message 4 control channel narrowband index field, a transport block size field, an uplink delay field, a repetition quantity field, or a transmit power control field.

In some embodiments of this application, when a TBS value indicated by the indication field is greater than a first threshold, the random access response grant is used to schedule a Msg3; or when a TBS value indicated by the indication field is greater than or equal to a first threshold, the random access response grant is used to schedule the Msg3.

The first threshold is a pre-specified value or a value configured by using radio resource control signaling.

An embodiment of this application further provides an information processing method. The method includes:

determining, by a network device, a Msg3 that needs to be scheduled;

determining, by the network device, a random access response grant, where the random access response grant includes an indication field, and the indication field is used to indicate to-be-scheduled indication information; and sending, by the network device, the random access response grant to a terminal device.

The network device generates the random access response grant. The network device determines a message 3 that may be sent by the terminal device. The network device indicates, by using the indication field in the random access response grant, to schedule different messages. For example, the indication field may indicate to schedule a first message 3 or a second message 3. In this case, the terminal device determines, based on the indication field configured by the network device, the Msg3 that needs to be scheduled, so that the terminal device may send the message 3 of a specified type according to a requirement of the network device.

In some embodiments of this application, the terminal device is at a coverage enhancement level 0, a coverage enhancement level 1, or a coverage enhancement mode A; and when the random access response grant is used to schedule the Msg3, the random access response grant does not include one or more of a channel state information request field, an uplink delay field, a modulation and coding scheme field, or a repetition quantity field;

a quantity of zero padding bits in the random access response grant is less than (4−M), where M is equal to a bit quantity of a narrowband index that indicates the Msg3 and that is in the random access response grant;

a bit quantity of a modulation and coding scheme field in the random access response grant is less than 3;

a bit quantity of a repetition quantity field in the random access response grant is less than 2;

a bit quantity of a transmit power control field in the random access response grant is less than 3; and/or a bit quantity of a message 3 or message 4 control channel narrowband index field in the random access response grant is less than 2.

The random access response grant does not include one or more of the channel state information request field, the uplink delay field, the modulation and coding scheme field, or the repetition quantity field. Therefore, the random access response grant may include the indication field, an original message length of the random access response grant is not increased, which has a backward compatibility feature. For another example, the network device may reduce an original bit quantity of the modulation and coding scheme field, the repetition quantity field, the transmit power control field, the message 3 or message 4 control channel narrowband index field in the random access response grant, to use the random access response grant to carry the indication field.

In some embodiments of this application, the terminal device is at a coverage enhancement level 2, a coverage enhancement level 3, or a coverage enhancement mode B; and when the random access response grant is used to schedule the Msg3, the random access response grant does not include one or more of a transport block size field, an uplink delay field, or a repetition quantity field;

a bit quantity of a transport block size field in the random access response grant is less than 2;

a bit quantity of a repetition quantity field in the random access response grant is less than 3;

a bit quantity of a message 3 or message 4 control channel narrowband index field in the random access response grant is less than 2.

In some embodiments of this application, when a bit state of the indication field belongs to a first bit state set, the random access response grant is used to schedule the first message 3; or when a bit state of the indication field belongs to a second bit state set, the random access response grant is used to schedule the Msg3. The indication field is one or more of a modulation and coding scheme field, a message 3 or message 4 control channel narrowband index field, a transport block size field, an uplink delay field, a repetition quantity field, or a transmit power control field.

In some embodiments of this application, when a TBS value indicated by the indication field is greater than a first threshold, the random access response grant is used to schedule a Msg3; or when a TBS value indicated by the indication field is greater than or equal to a first threshold, the random access response grant is used to schedule the Msg3.

The first threshold is a pre-specified value or a value configured by using radio resource control signaling.

An embodiment of this application provides an information processing method. The information processing method includes:

receiving, by a terminal device, a random access response grant sent by a network device, where the random access response grant includes a resource allocation field, and the resource allocation field indicates an allocated resource block, where when the random access response grant is used for scheduling of a first message 3, the resource allocation field includes three bits, the resource allocation field performs resource indication based on an uplink resource allocation type 2, and the resource allocation field indicates only resource allocation of one resource block or two resource blocks in narrowband; or when the random access response grant is used for scheduling of a second message 3, the resource allocation field includes N bits, and the resource allocation field indicates at least resource allocation of two resource blocks in narrowband;

determining, by the terminal device, the allocated resource block based on the resource allocation field; and sending, by the terminal device, the first message 3 to the network device when the random access response grant is used for the scheduling of the first message 3; or sending, by the terminal device, the second message 3 to the network device when the random access response grant is used for the scheduling of the second message 3.

In some embodiments of this application, when the random access response grant is used for the scheduling of the second message 3, the resource allocation field further indicates resource allocation of three resource blocks in the narrowband;

the resource allocation field further indicates resource allocation of one of three resource blocks and four resource blocks in the narrowband;

the resource allocation field further indicates resource allocation of one of three resource blocks, four resource blocks, and five resource blocks in the narrowband; or the resource allocation field further indicates resource allocation of one of three resource blocks, four resource blocks, five resource blocks, or six resource blocks in the narrowband.

In some embodiments of this application, the resource allocation field is further capable of indicating resource allocation of one resource block in the narrowband, and the resource allocation field indicates only resource allocation of the one resource block or the two resource blocks in the narrowband.

When a quantity of resource blocks allocated by using the resource allocation field is one resource block, a transport block size is determined based on K resource blocks, where K is a pre-specified positive integer greater than 3.

For example, K is equal to 4, or K is equal to 5.

An information processing method provided in an embodiment of this application is described. The information processing method includes:

determining, by a network device, a random access response grant, where the random access response grant includes a resource allocation field, and the resource allocation field indicates an allocated resource block;

when the random access response grant is used for scheduling of a first message 3, the resource allocation field includes three bits, the resource allocation field performs resource indication based on an uplink resource allocation type 2, and the resource allocation field indicates only resource allocation of one resource block or two resource blocks in narrowband; or when the random access response grant is used for scheduling of a second message 3, the resource allocation field includes N bits, and the resource allocation field indicates at least resource allocation of two resource blocks in narrowband;

sending, by the network device, the random access response grant to a terminal device; and receiving, by the network device when the random access response grant is used for the scheduling of the first message 3, the first message 3 sent by the terminal device; or receiving, by the network device when the random access response grant is used for the scheduling of the second message 3, the second message 3 sent by the terminal device.

When a Msg3 supports EDT, resource allocation indicated by a "Msg3 PUSCH Resource allocation" field in a UL grant in a MAC RAR is as follows:

Specific implementations include:

Embodiment 1: The resource allocation indicates more resource allocation solutions of two overlapping PRBs, and three remaining states are unused.

| Value of resource allocation field | Allocated resource blocks |
| --- | --- |
| '000' | 0 and 1 |
| '001' | 1 and 2 |
| '010' | 2 and 3 |
| '011' | 3 and 4 |
| '100' | 4 and 5 |
| '101' | unused |
| '110' | unused |
| '111' | unused |

Embodiment 2: The resource allocation indicates more resource allocation solutions of two overlapping PRBs and two non-overlapping PRBs.

| Value of resource allocation field | Allocated resource blocks |
| --- | --- |
| '000' | 0 and 1 |
| '001' | 1 and 2 |
| '010' | 2 and 3 |
| '011' | 3 and 4 |
| '100' | 4 and 5 |
| '101' | 0 and 1 |
| '110' | 2 and 3 |
| '111' | 4 and 5 |

Embodiment 3: The resource allocation indicates more resource allocation solutions of two overlapping PRBs and three overlapping PRBs.

| Value of resource allocation field | Allocated resource blocks |
| --- | --- |
| '000' | 0 and 1 |
| '001' | 1 and 2 |
| '010' | 2 and 3 |
| '011' | 3 and 4 |
| '100' | 4 and 5 |
| '101' | 0, 1, and 2 |
| '110' | 1, 2, and 3 |
| '111' | 2, 3, and 4 |

Embodiment 4: The resource allocation indicates more resource allocation solutions of two overlapping PRBs, two non-overlapping PRBs, and three overlapping PRBs.

| Value of resource allocation field | Allocated resource blocks |
| --- | --- |
| '000' | 0 and 1 |
| '001' | 1 and 2 |
| '010' | 2 and 3 |
| '011' | 4 and 5 |
| '100' | 0, 1, and 2 |
| '101' | 1, 2, and 3 |
| '110' | 2, 3, and 4 |
| '111' | 3, 4, and 5 |

Embodiment 5: The resource allocation indicates more resource allocation solutions of two overlapping PRBs and three non-overlapping PRBs.

| Value of resource allocation field | Allocated resource blocks |
| --- | --- |
| '000' | 0 and 1 |
| '001' | 1 and 2 |
| '010' | 2 and 3 |
| '011' | 3 and 4 |
| '100' | 4 and 5 |
| '101' | 0, 1, and 2 |
| '110' | 3, 4, and 5 |
| '111' | Unused |

Embodiment 6: The resource allocation indicates more resource allocation solutions of two overlapping PRBs, three non-overlapping PRBs, and four non-overlapping PRBs.

| Value of resource allocation field | Allocated resource blocks |
| --- | --- |
| '000' | 0 and 1 |
| '001' | 1 and 2 |
| '010' | 2 and 3 |
| '011' | 3 and 4 |
| '100' | 4 and 5 |

-continued

| Value of resource allocation field | Allocated resource blocks |
|---|---|
| '101' | 0, 1, and 2 |
| '110' | 3, 4, and 5 |
| '111' | 0, 1, 2, and 4 |

Embodiment 7: The resource allocation indicates more resource allocation solutions of two overlapping PRBs, three non-overlapping PRBs, four non-overlapping PRBs, five non-overlapping PRBs, and six non-overlapping PRBs.

| Value of resource allocation field | Allocated resource blocks |
|---|---|
| '000' | 0 and 1 |
| '001' | 2 and 3 |
| '010' | 4 and 5 |
| '011' | 0, 1, and 2 |
| '100' | 3, 4, and 5 |
| '101' | 0, 1, 2, and 3 |
| '110' | 0, 1, 2, 3, and 4 |
| '111' | 0, 1, 2, 3, 4, and 5 |

All possible states of two to six PRBs are described in the following table. Any eight of the following fifteen states may constitute one embodiment.

| States | Allocated resource blocks |
|---|---|
| 1 | 0 and 1 |
| 2 | 1 and 2 |
| 3 | 2 and 3 |
| 4 | 3 and 4 |
| 5 | 4 and 5 |
| 6 | 0, 1, and 2 |
| 7 | 1, 2, and 3 |
| 8 | 2, 3, and 4 |
| 9 | 3, 4, and 5 |
| 10 | 0, 1, 2, and 3 |
| 11 | 1, 2, 3, and 4 |
| 12 | 2, 3, 4, and 5 |
| 13 | 0, 1, 2, 3, and 4 |
| 14 | 1, 2, 3, 4, and 5 |
| 15 | 0, 1, 2, 3, 4, and 5 |

When DCI overheads are not additionally increased, more resource allocation of two PRBs or resource allocation of three, four, five, or six PRBs are indicated.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

To better implement the foregoing solutions in the embodiments of this application, the following further provides related apparatuses configured to implement the foregoing solutions.

Figure 5:
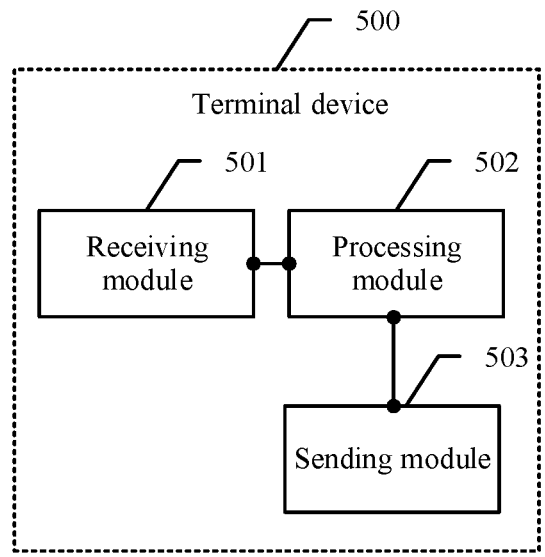
FIG. 5 is a schematic diagram of a composition structure of a terminal device according to an embodiment of this application.

As shown in FIG. 5, an embodiment of this application provides a network device 500, including:

a receiving module 501, configured to receive a random access response grant sent by a network device, where the random access response grant includes a resource allocation field, and the resource allocation field indicates a resource block allocated to the terminal device, where when the random access response grant is used for scheduling of a first message 3, the resource allocation field includes four bits, the resource allocation field performs resource indication in narrowband based on an uplink resource allocation type 0, and the resource allocation field is capable of indicating resource allocation of one of one resource block, two resource blocks, three resource blocks, or six resource blocks in the narrowband; or when the random access response grant is used for scheduling of a second message 3, the resource allocation field includes N bits, where N is a positive integer, the resource allocation field is at least capable of indicating resource allocation of one of two resource blocks, three resource blocks, or six resource blocks in narrowband, and the second Msg3 is used for data transmission;

a processing module 502, configured to determine, based on the resource allocation field, the resource block allocated to the terminal device; and a sending module 503, configured to: send the first message 3 to the network device on the allocated resource block when the random access response grant is used for the scheduling of the first message 3; or send the second message 3 to the network device on the allocated resource block when the random access response grant is used for the scheduling of the second message 3.

In some embodiments of this application, when the random access response grant is used for the scheduling of the second message 3, the resource allocation field is further capable of indicating resource allocation of four resource blocks and/or five resource blocks in the narrowband; or the resource allocation field is further capable of indicating resource allocation of one resource block in the narrowband.

In some embodiments of this application, that the resource allocation field is further capable of indicating resource allocation of four resource blocks and/or five resource blocks in the narrowband includes:

when N is equal to 4, that the resource allocation field indicates resource allocation in the narrowband includes: the resource allocation field is only capable of indicating resource allocation of one of the two resource blocks, the three resource blocks, the four resource blocks, the five resource blocks, or the six resource blocks in the narrowband;

when N is equal to 4, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband; or when N is equal to 5, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband.

In some embodiments of this application, when N is equal to 4, and the resource allocation field is only capable of indicating the resource allocation of one of the two resource blocks, the three resource blocks, the four resource blocks, the five resource blocks, or the six resource blocks in the narrowband, the processing module is configured to: determine a first resource indicator value based on the resource allocation field; determine a second resource indicator value based on the first resource indicator value, where a relationship between the first resource indicator value and the second resource indicator value meets a correspondence shown in the following formula: second resource indicator value=first resource indicator value+6; and determine, based on the second resource indicator value and the uplink resource allocation type 0, the resource block allocated to the terminal device.

In some embodiments of this application, when N is equal to 4, and the resource allocation field is only capable of indicating the resource allocation of one of the two resource blocks, the three resource blocks, the four resource blocks, the five resource blocks, or the six resource blocks in the narrowband, the processing module is configured to determine an allocated resource block quantity and an allocated start resource block index by using the following correspondence based on a third resource indicator value indicated by the resource allocation field, where a correspondence between the third resource indicator value indicated by the resource allocation field and both the allocated resource block quantity and the allocated start resource block index meets the correspondence shown in the following formula: when $(L_{CRBs}-2) \leq floor((M-1)/2)$, the third resource indicator value is equal to $M(L_{CRBs}-2)+RB_{START}$; or when $(L_{CRBs}-2)>floor((M-1)/2)$, the third resource indicator value is equal to $M(M-L_{CRBs})+(M-1-RB_{START})$, where M=6, $L_{CRBs}$ is the allocated resource block quantity, $2 \leq L_{CRBs} \leq 6$, $RB_{START}$ is the allocated start resource block index, and floor represents rounding down.

In some embodiments of this application, when N is equal to 4, and the resource allocation field is only capable of indicating the resource allocation of one of the two resource blocks, the three resource blocks, the four resource blocks, the five resource blocks, or the six resource blocks in the narrowband, the processing module is configured to determine an allocated resource block quantity and an allocated start resource block index by using the following correspondence based on a fourth resource indicator value indicated by the resource allocation field, where a correspondence between the fourth resource indicator value indicated by the resource allocation field and both the allocated resource block quantity and the allocated start resource block index meets the correspondence shown in the following formula: when $(L_{CRBs}-2) \leq floor(M/2)$, the fourth resource indicator value is equal to $M(L_{CRBs}-2)+RB_{START}$; or when $(L_{CRBs}-2)>floor(M/2)$, the fourth resource indicator value is equal to $M(M-L_{CRBs}+2)+(M-1-RB_{START})$, where M=5, $L_{CRBs}$ is the allocated resource block quantity, $2 \leq L_{CRBs} \leq 6$, $RB_{START}$ is the allocated start resource block index, and floor represents rounding down.

In some embodiments of this application, when N is equal to 4, the resource allocation field is only capable of indicating resource allocation of the one resource block, the two resource blocks, the three resource blocks, the four resource blocks, the five resource blocks, or the six resource blocks in the narrowband, the resource allocation field indicates the one resource block in the narrowband; and only one of bit states of the resource allocation field is used to allocate the one resource block.

In some embodiments of this application, the processing module is configured to: determine a fifth resource indicator value based on the resource allocation field; determine a sixth resource indicator value based on the fifth resource indicator value, where a relationship between the fifth resource indicator value and the sixth resource indicator value meets a correspondence shown in the following formula: sixth resource indicator value=fifth resource indicator value+5; and determine the allocated resource block based on the sixth resource indicator value and the uplink resource allocation type 0.

In some embodiments of this application, the bit state is 0000, and an allocated start resource block index in the resource allocation field is 5.

In some embodiments of this application, the resource allocation field is further capable of indicating the resource allocation of the one resource block in the narrowband, and that the resource allocation field indicates resource allocation in the narrowband includes: the resource allocation field is only capable of indicating resource allocation of one of the one resource block, the two resource blocks, the three resource blocks, or the six resource blocks in the narrowband; and the processing module is configured to: when the resource allocation field indicates the resource allocation of the one resource block in the narrowband, determine, by the terminal device, that the allocated resource block is one resource block, and determine a size of a transport block for the second message 3 based on K resource blocks, where K is a pre-specified positive integer greater than 1.

Figure 6:
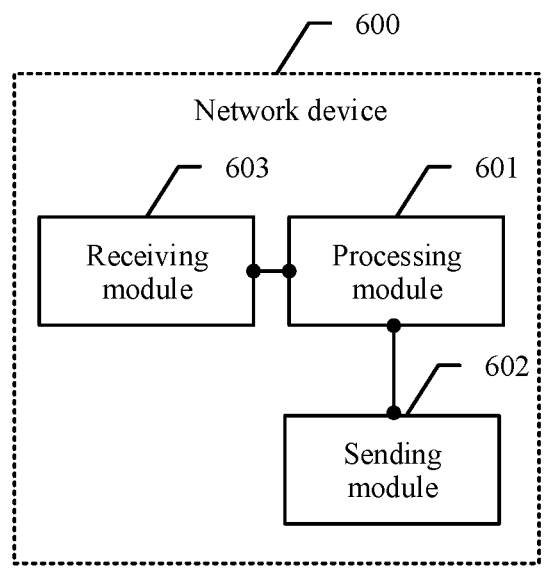
FIG. 6 is a schematic diagram of a composition structure of a network device according to an embodiment of this application.

As shown in FIG. 6, an embodiment of this application provides a network device 600, including:

a processing module 601, configured to determine a resource block that is allocated to a terminal device and that is used to send a first message 3 or a second message 3, where the second message 3 is used for data transmission; where the processing module 601 is further configured to determine a random access response grant, where the random access response grant includes a resource allocation field, and the resource allocation field indicates the resource block allocated to the terminal device, where when the random access response grant is used for scheduling of the first message 3, the resource allocation field includes four bits, the resource allocation field performs resource indication in narrowband based on an uplink resource allocation type 0, and the resource allocation field is capable of indicating resource allocation of one of one resource block, two resource blocks, three resource blocks, or six resource blocks in the narrowband; or when the random access response grant is used for scheduling of the second message 3, the resource allocation field includes N bits, where N is a positive integer, and the resource allocation field is at least capable of indicating resource allocation of one of two resource blocks, three resource blocks, or six resource blocks in narrowband;

a sending module 602, configured to send the random access response grant to the terminal device; and a receiving module 603, configured to: receive, on the allocated resource block when the random access response grant is used for the scheduling of the first message 3, the first message 3 sent by the terminal device; or receive, on the allocated resource block when the random access response grant is used for the scheduling of the second message 3, the second message 3 sent by the terminal device.

In some embodiments of this application, when the random access response grant is used for the scheduling of the second message 3, the resource allocation field is further capable of indicating resource allocation of four resource blocks and/or five resource blocks in the narrowband; or the resource allocation field is further capable of indicating resource allocation of one resource block in the narrowband.

In some embodiments of this application, that the resource allocation field is further capable of indicating resource allocation of four resource blocks and/or five resource blocks in the narrowband includes:

when N is equal to 4, that the resource allocation field indicates resource allocation in the narrowband includes: the resource allocation field is only capable of indicating resource allocation of one of the two resource blocks, the three resource blocks, the four resource blocks, the five resource blocks, or the six resource blocks in the narrowband;

when N is equal to 4, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband; or when N is equal to 5, that the resource allocation field indicates resource allocation in the narrowband includes: the resource allocation field is only capable of indicating resource allocation of one of one resource block, the two resource blocks, the three resource blocks, the four resource blocks, the five resource blocks, or the six resource blocks in the narrowband.

In some embodiments of this application, when N is equal to 4, and the resource allocation field is only capable of indicating the resource allocation of one of the two resource blocks, the three resource blocks, the four resource blocks, the five resource blocks, or the six resource blocks in the narrowband, the processing module is configured to: determine a second resource indicator value based on a determined resource used to send the first message 3 or the second message 3 and the uplink resource allocation type 0 used by the terminal device; determine a first resource indicator value based on the second resource indicator value, where a relationship between the first resource indicator value and the second resource indicator value meets a correspondence shown in the following formula: first resource indicator value=second resource indicator value−6; and determine the resource allocation field in the random access response grant, where the resource allocation field indicates the first resource indicator value, and the first resource indicator value is used to indicate the resource block allocated to the terminal device.

In some embodiments of this application, when N is equal to 4, and the resource allocation field is only capable of indicating the resource allocation of one of the two resource blocks, the three resource blocks, the four resource blocks, the five resource blocks, or the six resource blocks in the narrowband, the processing module is configured to: determine a third resource indicator value by using the following correspondence based on an allocated resource block quantity and an allocated start resource block index, where a correspondence between the third resource indicator value and both the allocated resource block quantity and the allocated start resource block index meets the correspondence shown in the following formula: when $(L_{CRBs}-2) \leq \text{floor}((M-1)/2)$, the third resource indicator value is equal to $M(L_{CRBs}-2)+RB_{START}$; or when $(L_{CRBs}-2) > \text{floor}((M-1)/2)$, the third resource indicator value is equal to $M(M-L_{CRBs})+(M-1-RB_{START})$, where $M=6$, $L_{CRBs}$ is the allocated resource block quantity, $2 \leq L_{CRBs} \leq 6$, $RB_{START}$ is the allocated start resource block index, and floor represents rounding down; and determine the resource allocation field in the random access response grant, where the resource allocation field indicates the third resource indicator value, and the third resource indicator value is used to indicate the resource block allocated to the terminal device.

In some embodiments of this application, when N is equal to 4, and the resource allocation field is only capable of indicating the resource allocation of one of the two resource blocks, the three resource blocks, the four resource blocks, the five resource blocks, or the six resource blocks in the narrowband, the processing module is configured to: determine a fourth resource indicator value by using the following correspondence based on an allocated resource block quantity and an allocated start resource block index, where a correspondence between the fourth resource indicator value and both the allocated resource block quantity and the allocated start resource block index meets the correspondence shown in the following formula: when $(L_{CRBs}-2) \leq \text{floor}(M/2)$, the fourth resource indicator value is equal to $M(L_{CRBs}-2)+RB_{START}$; or when $(L_{CRBs}-2) > \text{floor}(M/2)$, the fourth resource indicator value is equal to $M(M-L_{CRBs}+2)+(M-1-RB_{START})$, where $M=5$, $L_{CRBs}$ is the allocated resource block quantity, $2 \leq L_{CRBs} \leq 6$, $RB_{START}$ is the allocated start resource block index, and floor represents rounding down; and determine the resource allocation field in the random access response grant, where the resource allocation field indicates the fourth resource indicator value, and the fourth resource indicator value is used to indicate the resource block allocated to the terminal device.

In some embodiments of this application, when N is equal to 4, the resource allocation field is only capable of indicating resource allocation of the one resource block, the two resource blocks, the three resource blocks, the four resource blocks, the five resource blocks, or the six resource blocks in the narrowband, the resource allocation field indicates the one resource block in the narrowband; and only one of bit states of the resource allocation field is used to allocate the one resource block.

In some embodiments of this application, the processing module is configured to: determine a sixth resource indicator value based on a determined resource used to send the first message 3 or the second message 3 and the uplink resource allocation type 0 used by the terminal device; determine a fifth resource indicator value based on the sixth resource indicator value, where a relationship between the fifth resource indicator value and the sixth resource indicator value meets a correspondence shown in the following formula: fifth resource indicator value=sixth resource indicator value−5; and determine the resource allocation field in the random access response grant, where the resource allocation field indicates the fifth resource indicator value, and the fifth resource indicator value is used to indicate the resource block allocated to the terminal device.

In some embodiments of this application, the bit state is 0000, and an allocated start resource block index in the resource allocation field is 5.

In some embodiments of this application, the resource allocation field is further capable of indicating the resource allocation of the one resource block in the narrowband, and that the resource allocation field indicates resource allocation in the narrowband includes: the resource allocation field is only capable of indicating resource allocation of one of the one resource block, the two resource blocks, the three resource blocks, or the six resource blocks in the narrowband.

It should be noted that content such as information exchange between the modules/units of the apparatus and the execution processes thereof is based on the same idea as the method embodiments of the present invention, and produces the same technical effects as the method embodiments of the present invention. For specific content, refer to the foregoing description in the method embodiments of the present invention. Details are not described herein again.

An embodiment of the present invention further provides a computer storage medium. The computer storage medium stores a program. When the program is executed, one or more or all steps recorded in the foregoing method embodiments are performed.

Figure 7:
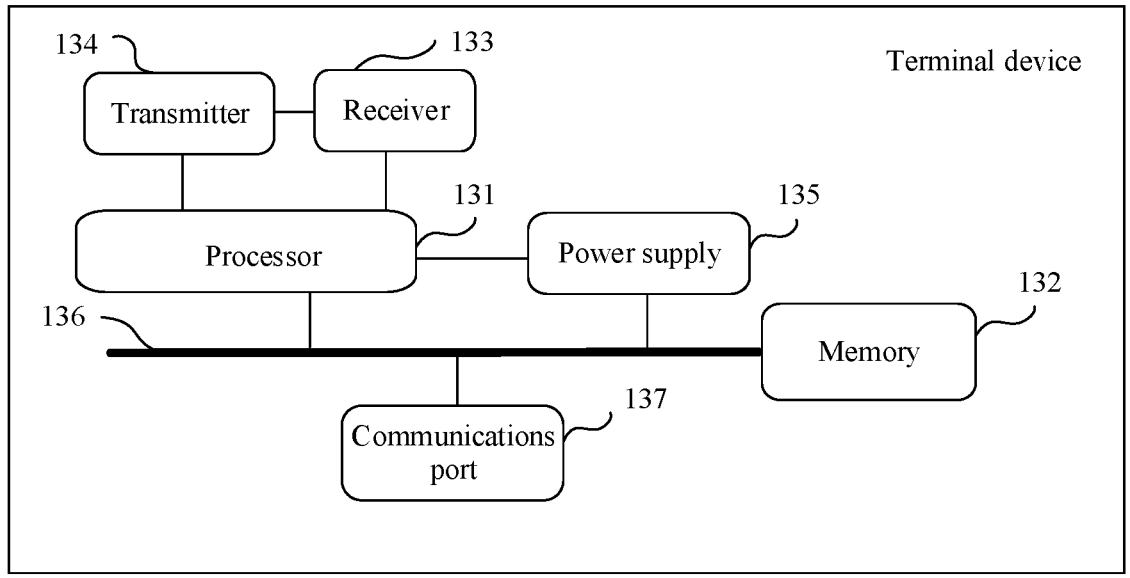
FIG. 7 is a schematic diagram of a composition structure of another terminal device according to an embodiment of this application.

FIG. 7 is a schematic structural diagram of another device according to an embodiment of this application. The device is a terminal device. The terminal device may include a processor 131 (for example, a CPU), a memory 132, a transmitter 134, and a receiver 133. The transmitter 134 and the receiver 133 are coupled to the processor 131. The processor 131 controls a sending action of the transmitter 134 and a receiving action of the receiver 133. The memory 132 may include a high-speed RAM memory, or may further include a nonvolatile memory NVM, for example, at least one magnetic disk memory. The memory 132 may store various instructions, to implement various processing functions and method steps in the embodiments of this application. Optionally, the terminal device in this embodiment of this application may further include one or more of a power supply 135, a communications bus 136, and a communications port 137. The receiver 133 and the transmitter 134 may be integrated into a transceiver of the terminal device, or may be a receive antenna and a transmit antenna that are independent of each other on the terminal device. The communications bus 136 is configured to implement communication connection between elements. The communications port 137 is configured to implement connection and communication between the terminal device and another peripheral.

In this embodiment of this application, the memory 132 is configured to store computer executable program code. The program code includes an instruction. When the processor 131 executes the instruction, the instruction enables the processor 131 to perform a processing action of the terminal device in the foregoing method embodiment, and enables the transmitter 134 to perform a sending action of the terminal device in the foregoing method embodiment. An implementation principle and a technical effect of this embodiment are similar to those of the foregoing method embodiment, and details are not described herein again.

Figure 8:
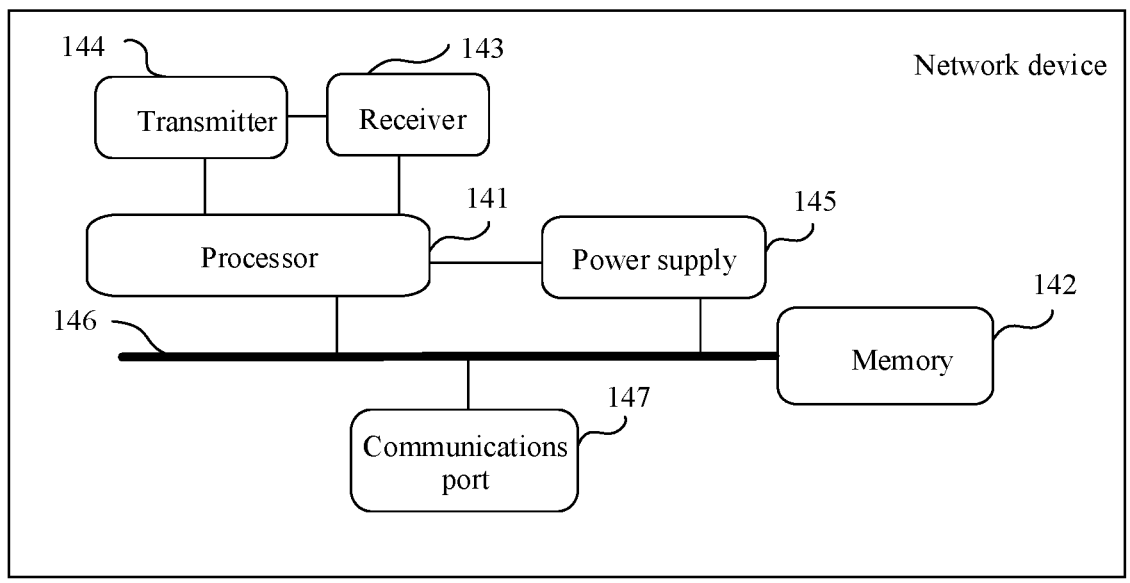
FIG. 8 is a schematic diagram of a composition structure of another network device according to an embodiment of this application.

FIG. 8 is a schematic structural diagram of another device according to an embodiment of this application. The device is a network device. The network device may include a processor (for example, a CPU) 141, a memory 142, a receiver 143, and a transmitter 144. The receiver 143 and the transmitter 144 are coupled to the processor 141. The processor 141 controls a receiving action of the receiver 143 and a sending action of the transmitter 144. The memory 142 may include a high-speed RAM memory, or may further include a nonvolatile memory NVM, for example, at least one magnetic disk memory. The memory 142 may store various instructions, to implement various processing functions and method steps in the embodiments of this application. Optionally, the network device in this embodiment of this application may further include one or more of a power supply 145, a communications bus 146, and a communications port 147. The receiver 143 and the transmitter 144 may be integrated into a transceiver of the network device, or may be a receive antenna and a transmit antenna that are independent of each other on the network device. The communications bus 146 is configured to implement communication connection between elements. The communications port 147 is configured to implement connection and communication between the network device and another peripheral.

In this embodiment of this application, the memory 142 is configured to store computer executable program code. The program code includes an instruction. When the processor 141 executes the instruction, the instruction enables the processor 141 to perform a processing action of the network device in the foregoing method embodiment, and enables the transmitter 144 to perform a sending action of the network device in the foregoing method embodiment. An implementation principle and a technical effect of this embodiment are similar to those of the foregoing method embodiment, and details are not described herein again.

In another possible design, when the apparatus is a chip in a terminal. The chip includes a processing unit and a communications unit. The processing unit may be, for example, a processor. The communications unit may be, for example, an input/output interface, a pin, or a circuit. The processing unit may execute a computer-executable instruction stored in a storage unit, so that the chip in the terminal performs the information processing method in any design of the first aspect. Optionally, the storage unit is a storage unit in the chip, for example, a register or a buffer, or the storage unit may be a storage unit in the terminal but outside the chip, for example, a read-only memory (ROM), another type of static storage device capable of storing static information and instructions, or a random access memory (RAM).

The processor mentioned anywhere above may be a general-purpose central processing unit (CPU), a microprocessor, an application-specific integrated circuit (ASIC), or one or more integrated circuits for controlling program execution of the information processing method according to the first aspect.

In addition, it should be noted that the apparatus embodiments described above are merely examples. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by this application, connection relationships between modules indicate that the modules have communication connections with each other, which may be specifically implemented as one or more communications buses or signal cables. A person of ordinary skill in the art may understand and implement the embodiments of this application without creative efforts.

Based on the description of the foregoing implementations, a person skilled in the art may clearly understand that this application may be implemented by using software in addition to necessary universal hardware, or by using dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, for this application, software program implementation is a better implementation in more cases. Based on such an understanding, the technical solutions in this application essentially or the part contributing to the prior art may be implemented in a form of a software product. The software product is stored in a readable storage medium, such as a floppy disk of a computer, a USB flash drive, a removable hard disk, a read-only memory (ROM), a random access memory (RAM), a magnetic disk, or an optical disc, and includes several instructions for instructing a computer device (which may be a personal computer, a server, a network device, and the like) to perform the methods in the embodiments of this application.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. An information processing method comprising:
    receiving, by a terminal device, a random access response grant from a network device,
        wherein the random access response grant comprises a resource allocation field that indicates a resource block allocated to the terminal device,
        wherein the resource allocation field comprises four (4) bits when the random access response grant is used by the terminal for scheduling a first message 3 (Msg3), and the resource allocation field is capable of indicating resource allocation of one of the following (a)-(d) in a narrowband: (a) one resource block, (b) two resource blocks, (c) three resource blocks, or (d) six resource blocks,
        wherein the resource allocation field comprises five (5) bits when the random access response grant is being used by the terminal for scheduling a second Msg3 that is different from the first Msg3,
        wherein the resource allocation field performs resource indication in the narrowband based on an uplink resource allocation type 0, and
        wherein, when the second Msg3 is used for data transmission, the resource allocation field is at least capable of indicating resource allocation of one of two resource blocks, three resource blocks, four resource blocks, five resource blocks, or six resource blocks in the narrowband;
    determining, by the terminal device and based on the resource allocation field, the resource block allocated to the terminal device;
    sending, by the terminal device, the first Msg3 to the network device on the allocated resource block when the random access response grant is used for scheduling the first Msg3; and
    sending, by the terminal device, the second Msg3 to the network device on the allocated resource block when the random access response grant is used for scheduling the second Msg3.

2. The method according to claim 1, wherein the resource allocation field is limited to be only capable of indicating resource allocation of one of one resource block, the two resource blocks, the three resource blocks, the four resource blocks, the five resource blocks, or the six resource blocks in the narrowband.

3. An information processing method comprising:
    determining, by a network device, a resource block that is allocated to a terminal device and used to send a first 3 (Msg3) or a second Msg3,
        wherein the second Msg3 is used for data transmission, and
        wherein the first Msg3 and second Msg3 are different messages;
    determining, by the network device, a random access response grant comprising a resource allocation field that indicates the resource block allocated to the terminal device,
        wherein the resource allocation field comprises four (4) bits when the random access response grant is used for scheduling the first Msg3, and the resource allocation field is capable of indicating resource allocation of one of the following (a)-(d) in a narrowband: (a) one resource block, (b) two resource blocks, (c) three resource blocks, or (d) six resource blocks,
        wherein, the resource allocation field comprises five (5) bits when the random access response grant is used for scheduling the second Msg3,
        wherein the resource allocation field performs resource indication in the narrowband based on an uplink resource allocation type 0, and
        wherein, when the second Msg3 is used for data transmission, the resource allocation field is at least capable of indicating resource allocation of one of two resource blocks, three resource blocks, four resource blocks, five resource blocks, or six resource blocks in the narrowband;
    sending, by the network device, the random access response grant to the terminal device;
    receiving, by the network device and on the allocated resource block, the first Msg3 sent by the terminal device when the random access response grant is used for scheduling the first Msg3; and
    receiving, by the network device and on the allocated resource block, the second Msg3 sent by the terminal device when the random access response grant is used for scheduling the second Msg3.

4. The method according to claim 3, wherein the resource allocation field is only capable of indicating resource allocation of one of one resource block, the two resource blocks, the three resource blocks, the four resource blocks, the five resource blocks, or the six resource blocks in the narrowband.

5. A terminal device comprising:
a receiver configured to receive a random access response grant sent by a network device,
wherein the random access response grant comprises a resource allocation field that indicates a resource block allocated to the terminal device,
wherein the resource allocation field comprises four (4) bits when the random access response grant is used by the terminal device for scheduling of a first message 3 (Msg3),
wherein the resource allocation field comprises five (5) bits when the random access response grant being used by the terminal for scheduling a second Msg3 that is different from the first Msg3,
wherein the resource allocation field performs resource indication in a narrowband based on an uplink resource allocation type 0,
wherein, when the first Msg3 is used for data transmission, the resource allocation field is capable of indicating resource allocation of one of the following (a)-(d) in the narrowband: (a) one resource block, (b) two resource blocks, (c) three resource blocks, or (d) six resource blocks, and
wherein, when the second Msg3 is used for data transmission, the resource allocation field is at least capable of indicating resource allocation of one of two resource blocks, three resource blocks, four resource blocks, five resource blocks, or six resource blocks in the narrowband;
a processor configured to determine, based on the resource allocation field, the resource block allocated to the terminal device; and
a transmitter configured to:
send the first Msg3 to the network device on the allocated resource block when the random access response grant is used for scheduling the first Msg3; and
send the second Msg3 to the network device on the allocated resource block when the random access response grant is used for scheduling the second Msg3.

6. The terminal device according to claim 5, wherein the resource allocation field is only capable of indicating resource allocation of one of one resource block, the two resource blocks, the three resource blocks, the four resource blocks, the five resource blocks, or the six resource blocks in the narrowband.

7. A network device comprising:
a processor configured to determine a resource block that is allocated to a terminal device and that is used to send a first message 3 (Msg3) or a second Msg3,
wherein the second Msg3 is used for data transmission, and
wherein the first and second Msg3s are different;
the processor is further configured to determine a random access response grant comprising a resource allocation field that indicates the resource block allocated to the terminal device,
wherein, when the resource allocation field comprises four bits, the random access response grant is used for scheduling the first Msg3,
wherein the resource allocation field performs resource indication in narrowband based on an uplink resource allocation type 0,
wherein, when the first Msg3 is used for data transmission, the resource allocation field is capable of indicating resource allocation of one of the following (a)-(d) in the narrowband: (a) one resource block, (b) two resource blocks, (c) three resource blocks, or (d) six resource blocks,
wherein, when the resource allocation field comprises five (5) bits, the random access response grant is used for scheduling the second Msg3, and
wherein, when the second Msg3 is used for data transmission, the resource allocation field is at least capable of indicating resource allocation of one of two resource blocks, three resource blocks, four resource blocks, five resource blocks, or six resource blocks in the narrowband;
a transmitter configured to send the random access response grant to the terminal device; and
a receiver configured to:
receive the first Msg3 from the terminal device on the allocated resource block when the random access response grant is used for scheduling the first Msg3; and
receive the second Msg3 from the terminal device on the allocated resource block when the random access response grant is used for scheduling the second Msg3.

8. The network device according to claim 7, wherein the resource allocation field is limited to be only capable of indicating resource allocation of one of one resource block, the two resource blocks, the three resource blocks, the four resource blocks, the five resource blocks, or the six resource blocks in the narrowband.

* * * * *

UNITED STATES PATENT AND TRADEMARK OFFICE
CERTIFICATE OF CORRECTION

| | |
|---|---|
| PATENT NO. | : 11,533,761 B2 |
| APPLICATION NO. | : 17/063362 |
| DATED | : December 20, 2022 |
| INVENTOR(S) | : Zhao et al. |

It is certified that error appears in the above-identified patent and that said Letters Patent is hereby corrected as shown below:

In the Claims

Claim 7: Column 52, Line 18: "indication in narrowband based on an uplink" should read
-- indication in a narrowband based on an uplink --.

Signed and Sealed this
Twenty-third Day of May, 2023

Katherine Kelly Vidal
*Director of the United States Patent and Trademark Office*